US 9,484,054 B2

(12) United States Patent
Wakabayashi et al.

(10) Patent No.: US 9,484,054 B2
(45) Date of Patent: Nov. 1, 2016

(54) OPTICAL DISC INFORMATION DEVICE AND INFORMATION PROCESSING DEVICE

(71) Applicant: Panasonic Intellectual Property Management Co., Ltd., Osaka (JP)

(72) Inventors: Kanji Wakabayashi, Kyoto (JP); Kousei Sano, Osaka (JP); Fumitomo Yamasaki, Nara (JP); Yoshiaki Komma, Osaka (JP); Toshiyasu Tanaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/848,882

(22) Filed: Sep. 9, 2015

(65) Prior Publication Data

US 2015/0380041 A1     Dec. 31, 2015

Related U.S. Application Data

(63) Continuation of application No. PCT/JP2014/003261, filed on Jun. 17, 2014.

(30) Foreign Application Priority Data

Jun. 21, 2013  (JP) .................................. 2013-130875
Aug. 9, 2013   (JP) .................................. 2013-166769

(51) Int. Cl.
*G11B 7/005*    (2006.01)
*G11B 7/1374*   (2012.01)
(Continued)

(52) U.S. Cl.
CPC ........... *G11B 7/1374* (2013.01); *G11B 7/0037* (2013.01); *G11B 7/00718* (2013.01);
(Continued)

(58) Field of Classification Search
None
See application file for complete search history.

(56) References Cited

U.S. PATENT DOCUMENTS 5,347,504 A    9/1994  Ito et al.
5,430,701 A    7/1995  Ito et al.
(Continued)

FOREIGN PATENT DOCUMENTS

JP    6-68473     3/1994
JP    8-249664    9/1996
(Continued)

OTHER PUBLICATIONS

International Search Report issued Jul. 29, 2014 in International (PCT) Application No. PCT/JP2014/003261.
(Continued)

*Primary Examiner* — Brian Butcher
(74) *Attorney, Agent, or Firm* — Wenderoth, Lind & Ponack, L.L.P.

(57) ABSTRACT

An optical disc information device is an optical disc information device for reproducing and/or recording information with respect to an optical disc including a track in the form of a groove, and capable of recording information in a land portion and in a groove portion of the groove. The optical disc information device includes a laser light source, an objective lens, a transmittance limiting element, a dividing element, a light detector, a central amplifier, at least two end amplifiers, a gain controller, an adder, a reproduction signal processor, and a control signal processor. The transmittance limiting element includes a first central region, and at least two first end regions which interpose the first central region therebetween, and attenuates light passing through at least the first end regions out of a light flux emitted from the laser light source more strongly than light passing through the first central region.

18 Claims, 28 Drawing Sheets

(51) Int. Cl.
  *G11B 7/0037* (2006.01)
  *G11B 7/007* (2006.01)
  *G11B 7/1381* (2012.01)
  *G11B 7/1395* (2012.01)
  *G11B 20/10* (2006.01)
  G11B 7/24073 (2013.01)
  G11B 7/1353 (2012.01)

(52) U.S. Cl.
  CPC .......... *G11B 7/1381* (2013.01); *G11B 7/1395* (2013.01); *G11B 20/10027* (2013.01); *G11B 7/005* (2013.01); *G11B 7/1353* (2013.01); *G11B 7/24073* (2013.01); *G11B 2007/00709* (2013.01)

(56) References Cited

U.S. PATENT DOCUMENTS

| | | | |
|---|---|---|---|
| 5,440,536 | A | 8/1995 | Ito et al. |
| 6,580,676 | B1 | 6/2003 | Yanagisawa et al. |
| 6,646,976 | B1 | 11/2003 | Chung et al. |
| 2001/0036133 | A1 | 11/2001 | Nagata et al. |
| 2004/0109242 | A1 | 6/2004 | Komma et al. |
| 2004/0223435 | A1 | 11/2004 | Nishi et al. |
| 2008/0084797 | A1 | 4/2008 | Sano et al. |
| 2008/0175110 | A1 | 7/2008 | Yamasaki et al. |
| 2009/0278029 | A1 | 11/2009 | Ogasawara et al. |
| 2012/0082201 | A1 | 4/2012 | Shiraishi |
| 2012/0281516 | A1* | 11/2012 | Jung ............... G11B 7/1381 369/103 |
| 2015/0138942 | A1 | 5/2015 | Wakabayashi et al. |

FOREIGN PATENT DOCUMENTS

| | | |
|---|---|---|
| JP | 11-328680 | 11/1999 |
| JP | 2001-256652 | 9/2001 |
| JP | 2004-192783 | 7/2004 |
| JP | 2004-273024 | 9/2004 |
| JP | 2007-66492 | 3/2007 |
| JP | 2008-135151 | 6/2008 |
| JP | 2008-198336 | 8/2008 |
| WO | 2008/053548 | 5/2008 |

OTHER PUBLICATIONS

International Search Report issued Jul. 29, 2014 in International (PCT) Application No. PCT/JP2014/003260.

\* cited by examiner

OPTICAL DISC INFORMATION DEVICE AND INFORMATION PROCESSING DEVICE

TECHNICAL FIELD

The present invention relates to an optical disc information device for reproducing and/or recording information with respect to an optical disc, and an information processing device incorporated with the optical disc information device such as a computer, a server, an optical disc player, and an optical disc recorder.

BACKGROUND ART

There is a demand for increasing the recording density of an optical disc. In order to implement an optical disc information device capable of high-density recording and reproduction, it is necessary to increase the recording density in a track direction by reducing the track pitch of an optical disc or to increase the recording density in a linear direction.

As described above, it is effective to reduce the track pitch of an optical disc in order to increase the recording density of an optical disc information device (see e.g. Patent Literature 1).

CITATION LIST

Patent Literature

Patent Literature 1: Japanese Unexamined Patent Publication No. H5-242512

SUMMARY OF INVENTION

An object of the invention is to provide an optical disc information device and an information processing device that enable to sufficiently reduce crosstalk which may leak from an adjacent track in a high-density optical disc in which the recording density in a track direction is increased.

An optical disc information device according to an aspect of the invention is an optical disc information device for reproducing and/or recording information with respect to an optical disc having a track in the form of a groove, and capable of recording information in a land portion and in a groove portion of the groove. The optical disc information device is provided with a laser light source which emits a light flux of a wavelength λ; an objective lens having a numerical aperture NA and configured to collect the light flux emitted from the laser light source and to form a light collecting spot on the optical disc; a transmittance limiting element including a first central region, and at least two first end regions which interpose the first central region therebetween, and configured to attenuate light passing through at least the first end regions out of the light flux emitted from the laser light source more strongly than light passing through the first central region; a dividing element including a second central region, and at least two second end regions which interpose the second central region therebetween, and configured to divide reflected light that is reflected and diffracted on the optical disc into a light flux of the second central region and light fluxes of the second end regions; a light detector including a central light receiving portion which receives the light flux of the second central region, and at least two end light receiving portions which receive the light fluxes of the second end regions, and configured to output a light amount signal in accordance with a light amount of each of the received light fluxes; a central amplifier which receives the light amount signal from the central light receiving portion and outputs a central amplification signal amplified by a predetermined gain; at least two end amplifiers which receive the light amount signals from the end light receiving portions and output end amplification signals amplified by a predetermined gain; a gain controller which controls the gain of the central amplifier and the gains of the end amplifiers; an adder which sums up the central amplification signal from the central amplifier and the end amplification signals from the end amplifiers, and outputs an information signal; a reproduction signal processor which processes the information signal and outputs a reproduction signal; and a control signal processor which receives reflected light that is reflected and diffracted on the optical disc, and generates a focusing control signal and a tracking control signal.

Advantageous Effects of Invention

According to the optical disc information device having the aforementioned configuration, it is possible to sufficiently reduce crosstalk which may leak from an adjacent track in a high-density optical disc, in which the recording density in a track direction is increased.

DESCRIPTION OF EMBODIMENTS

Figure 1:
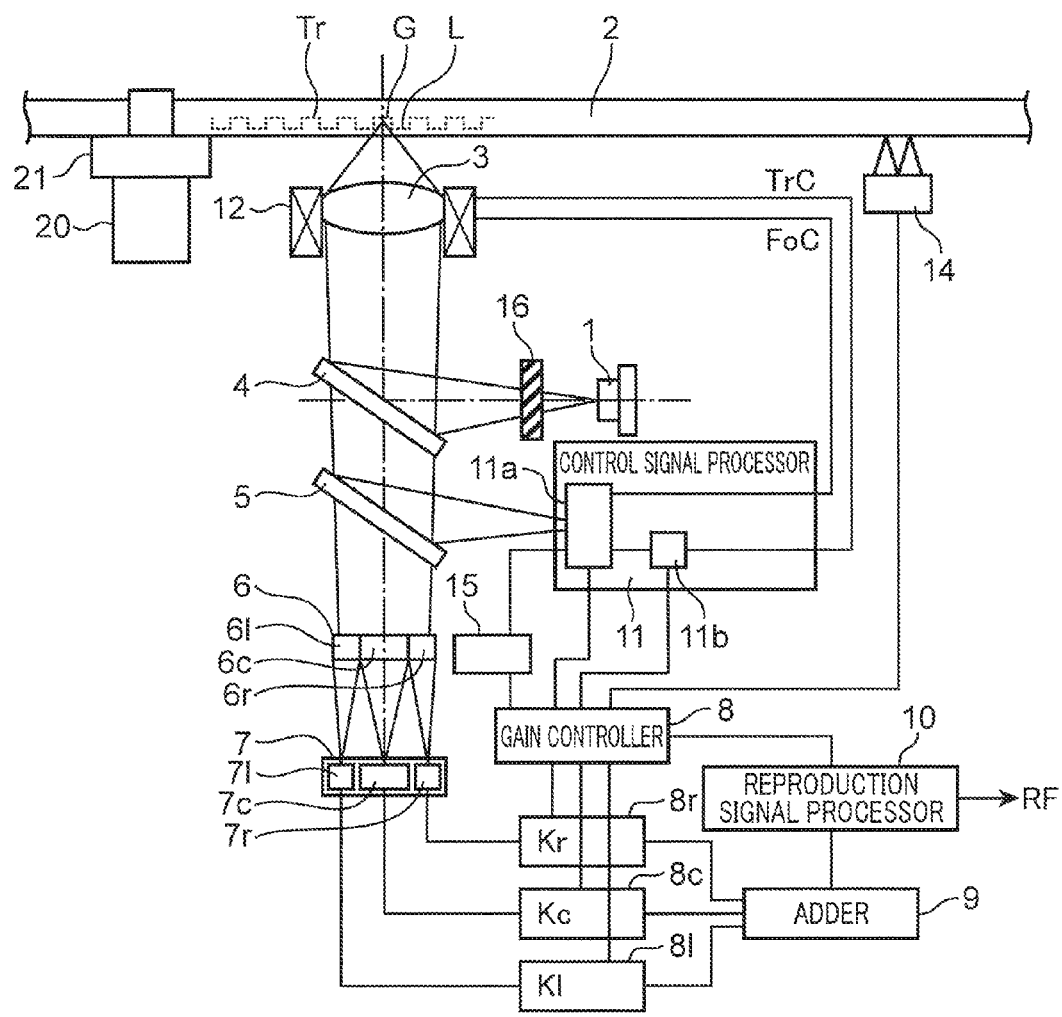
FIG. 1 is a schematic diagram illustrating a configuration of an optical disc information device in a first embodiment of the invention.

In the following, embodiments are described in detail referring to the drawings, as necessary. It should be noted, however, that detailed description may be omitted unless otherwise specifically required. For instance, detailed description about well-known matters and repeated description about substantially the same configurations may be omitted. This is in order to avoid redundancy of description, and to facilitate comprehension of a person skilled in the art.

The inventors of the present application provide the accompanying drawings and the following description so that a person skilled in the art can fully understand the present disclosure, and therefore, and have no intention to limit the subject matter described in the claims.

As described above, it is effective to reduce the track pitch of an optical disc in order to increase the recording density of an optical disc information device. However, there is a problem i.e. an increase of crosstalk such that a signal recorded in an adjacent track of a scanning track may be added to a reproduction signal and turn into noise.

In order to solve the aforementioned problem, a conventional optical disc information device is configured to cancel crosstalk by setting outputs from three light receiving elements obtained by dividing along directions orthogonal to a track direction as a signal C from the central portion, a signal R from the right portion, and a signal L from the left portion in a one-beam optical system, and by implementing computational correction: $S = K \cdot C + R + L$ (where K is a constant).

In recent years, however, in order to meet the demand for an increase in the information amount accompanied by spread of the Internet, there is a need for an optical disc information device configured such that the recording density is increased by reducing the track pitch.

In the following, each of the embodiments of the invention is described, referring to the drawings, as an example of the optical disc information device that meets the aforementioned demand.

First Embodiment

Figure 2:
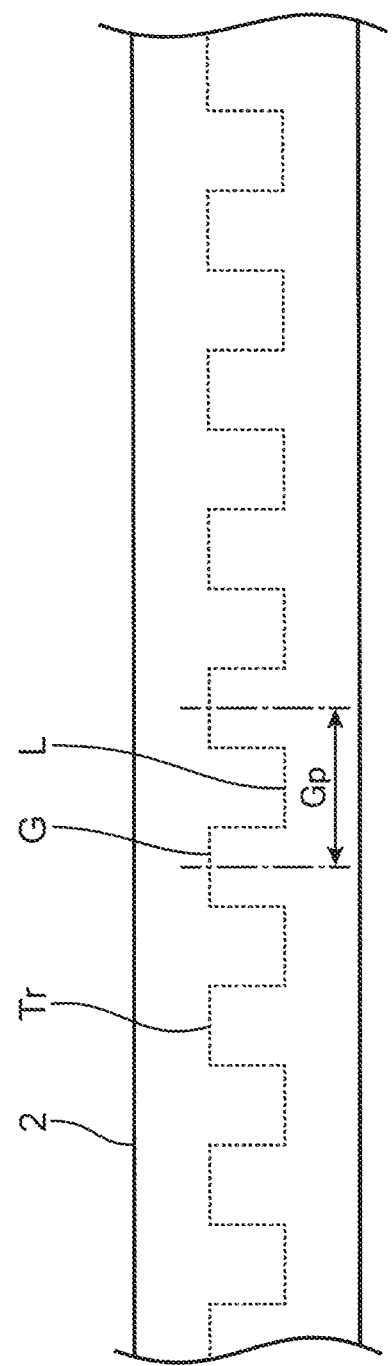
FIG. 2 is a schematic diagram illustrating a groove structure of an optical disc for use in the optical disc information device in the first embodiment of the invention.
Figure 3:
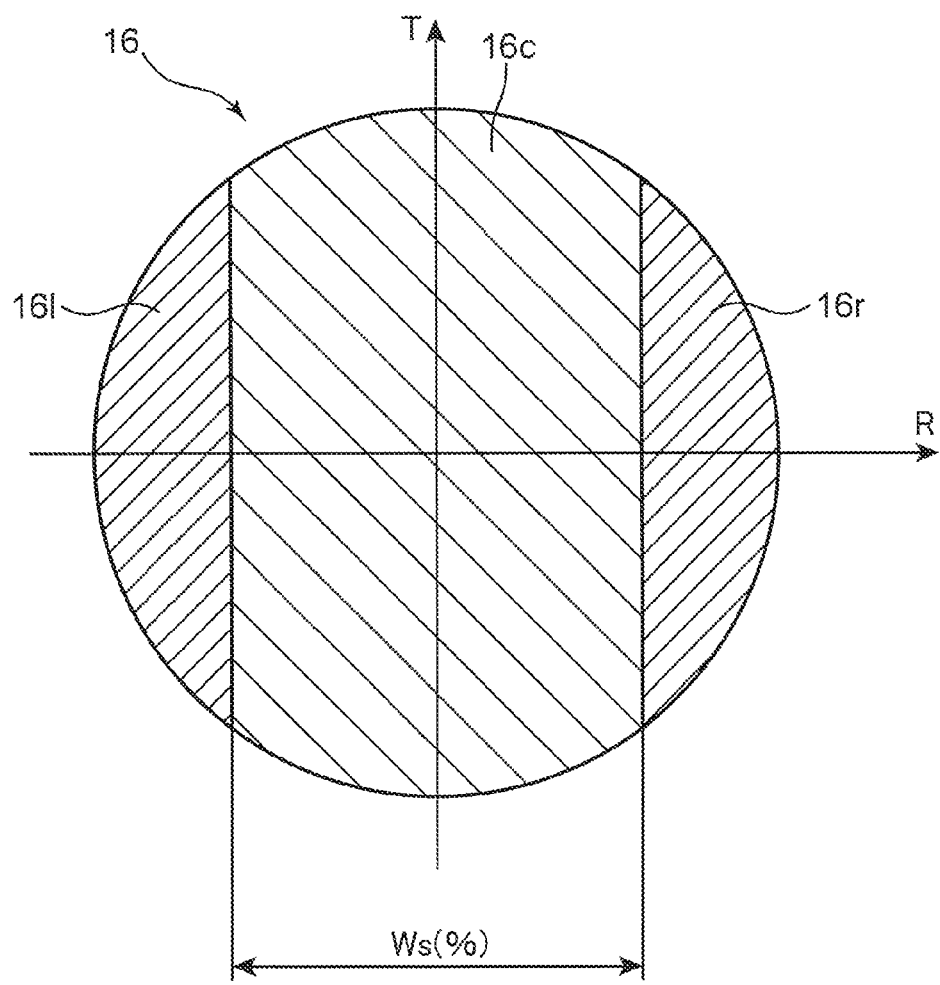
FIG. 3 is a schematic diagram illustrating a regional configuration of a transmittance limiting element of the optical disc information device in the first embodiment of the invention.
Figure 4:
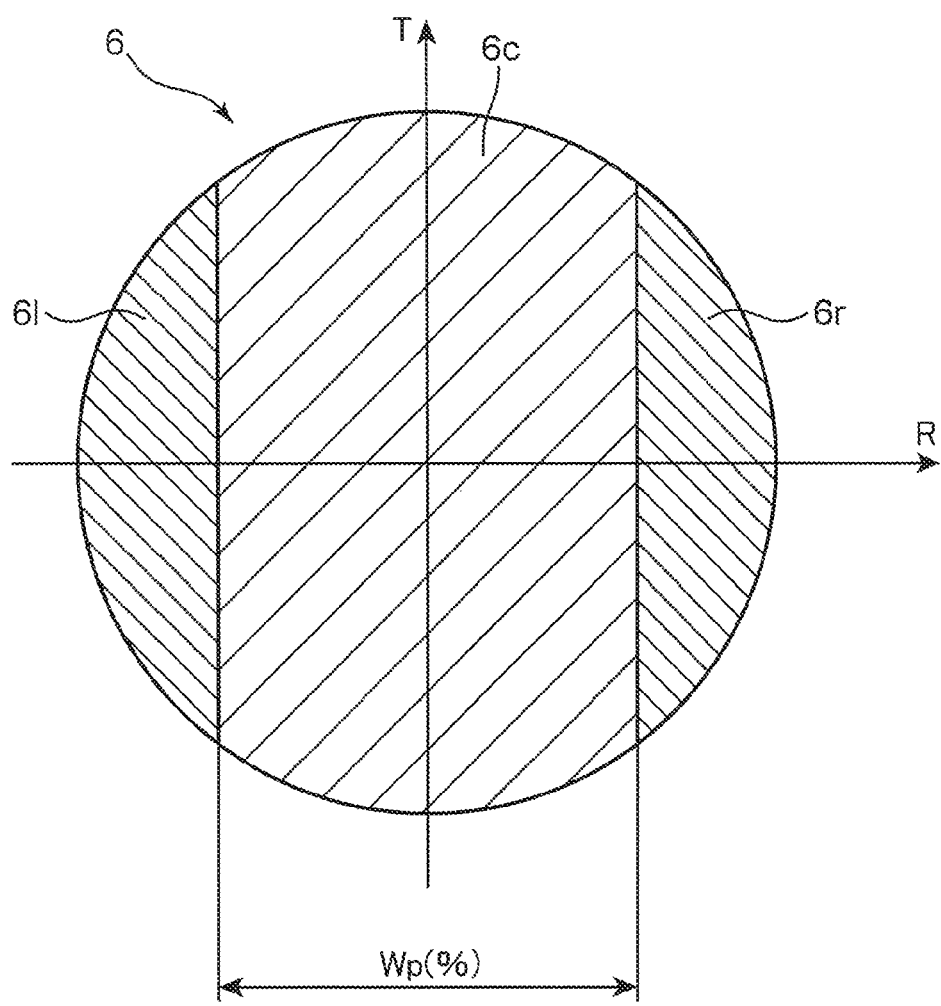
FIG. 4 is a schematic diagram illustrating a dividing configuration of a dividing element of the optical disc information device in the first embodiment of the invention.

FIG. 1 is a schematic diagram illustrating a configuration of an optical disc information device in the first embodiment of the invention. FIG. 2 is a schematic diagram illustrating a groove structure of an optical disc for use in the optical disc information device in the first embodiment of the invention. FIG. 3 is a schematic diagram illustrating a transmittance configuration of a transmittance limiting element of the optical disc information device in the first embodiment of the invention. FIG. 4 is a schematic diagram illustrating a dividing configuration of a dividing element of the optical disc information device in the first embodiment of the invention.

In FIG. 1, the optical disc information device is provided with a blue semiconductor laser unit 1, an objective lens 3, a laser mirror 4, a beam splitter 5, a dividing element 6, a light detector 7, a gain controller 8, amplifiers 8c, 8r, and 8l, an adder 9, a reproduction signal processor 10, a control signal processor 11, an objective lens actuator 12, a tilt detector 14, a lens shift detector 15, a transmittance limiting element 16, a spindle motor 20, and a turntable 21.

The control signal processor 11 includes a control signal generator 11a and a tracking switcher 11b. The dividing element 6 includes a central region 6c, and two end regions 6r and 6l. The light detector 7 includes three light receiving portions 7c, 7r, and 7l.

Further, the transmittance limiting element 16, the dividing element 6, the light detector 7, the gain controller 8, the amplifiers 8c, 8r, and 8l, and the adder 9 constitute a crosstalk canceller that cancels crosstalk from an adjacent track of the optical disc 2. The configurations of the gain controller and of the amplifiers are not specifically limited to the example illustrated in FIG. 1. For instance, it is possible to use a gain variable amplification circuit provided with a gain controller and at least three amplifiers.

The blue semiconductor laser unit 1 is a laser light source which emits a light flux of the wavelength λ. The wavelength λ of light to be emitted from the blue semiconductor laser unit 1 is a wavelength in the range of from 400 nm to 415 nm. In the embodiment, for instance, the blue semiconductor laser unit 1 is configured to emit a light beam (a light flux) having the wavelength of about 405 nm.

The objective lens 3 is an objective lens having a numerical aperture NA, and configured to collect a light flux emitted from the blue semiconductor laser unit 1 and to form a light collecting spot on the optical disc 2. In the embodiment, for instance, the objective lens 3 is configured to collect a light beam having the wavelength of about 405 nm by the numerical aperture NA=0.85.

The optical disc 2 is placed on the turntable 21. The optical disc 2 is rotated by causing the spindle motor 20 to turn the turntable 21. Further, as illustrated in FIG. 2, the optical disc 2 includes a track Tr in the form of a groove, and is capable of recording information in a land portion L and in a groove portion G of the groove. When the groove interval is Gp, the optical disc information device satisfies the following formula.

$$(Gp/2) < (1.2 \cdot \lambda)/(2 \cdot NA)$$

In the embodiment, for instance, the groove interval Gp=0.46 μm, and Gp/2 i.e. the track pitch Tp=0.23 μm. Gp/2 is smaller than $(1.2 \cdot \lambda)/(2 \cdot NA) = (1.2 \times 0.405)/(2 \times 0.85) = 0.286$ μm.

In this example, the track pitch Tp of the optical disc 2 is reduced to 0.23 μm, whereas the track pitch of BD is 0.32 μm. Thus, it is expected to increase the recording density by about two times.

Referring back to FIG. 1, a light beam emitted from the blue semiconductor laser unit 1 is incident on the transmittance limiting element 16.

As illustrated in FIG. 3, the transmittance limiting element 16 includes a central region 16c, and two end regions 16r and 16l. The transmittance limiting element 16 is divided into three regions along directions associated with a radial direction R of the optical disc 2 (radial directions of the optical disc 2 i.e. directions orthogonal to a tangential direction T). The transmittance limiting element 16 is divided into the central region 16c, and the two end regions 16r and 16l which interpose the central region 16c therebetween.

The transmittance limiting element 16 attenuates light passing through at least the end regions 16r and 16l out of the light beam emitted from the blue semiconductor laser unit 1 more strongly than light passing through the central region 16c. In the embodiment, for instance, whereas about 100% of light passes through the central region 16c, light passing through the end regions 16r and 16l is attenuated. The transmittance of the central region 16c is not specifically limited to the aforementioned example. As far as the transmittance of the central region 16c is higher than the transmittance of the end regions 16r and 16l, any other transmittance such as 80% may be used.

The transmittance limiting element 16 is a diffraction element which is manufactured to function as a diffraction grating in which a fine groove is formed in a glass surface, or a diffraction element which is manufactured by charging liquid crystal between two glass plates. The transmittance limiting element 16 is constituted of a polarization hologram which functions as a diffraction grating with respect to only the light having a predetermined polarization direction. The transmittance limiting element 16 restricts the transmittance by the diffraction efficiency.

In the embodiment, for instance, the transmittance of the end regions 16r and 16l is about 85%, and the width Ws of the central region 16c in the radial direction R is about 45% of the diameter of a light beam.

Referring back to FIG. 1, after a light beam passes through the transmittance limiting element 16, the light beam is reflected on the laser mirror 4 and is directed toward the objective lens 3. A blue light beam transmitted through the objective lens 3 is collected on e.g. the groove portion G (or on the land portion L) on the information recording surface of the optical disc 2 for irradiation.

Reflected light that is reflected and diffracted on the information recording surface of the optical disc 2 passes through the objective lens 3 in the same manner as the outward path, passes through the laser mirror 4 and through the beam splitter 5, and impinges on the dividing element 6. The dividing element 6 is a diffraction element which is manufactured to function as a diffraction grating, in which a fine groove is formed in a glass surface.

As illustrated in FIG. 4, the dividing element 6 is divided into e.g. three regions along directions associated with the radial direction R of the optical disc 2 (radial directions of the optical disc 2 i.e. directions orthogonal to the tangential direction T). The dividing element 6 is divided into the central region 6c, and the two end regions 6r and 6l which interpose the central region 6c therebetween. A light beam passing through each of the regions is separated in directions different from each other by the diffraction grating of each of the regions. In the embodiment, for instance, the width Wp of the central region 6c in the radial direction R of the dividing element 6 is about 45% of the diameter of a light beam.

Thereafter, the separated light beams are respectively incident on the three different light receiving portions 7c, 7r, and 7l of the light detector 7. Specifically, a light beam passing through the central region 6c is incident on the light receiving portion 7c (a central light receiving portion) of the light detector 7, a light beam passing through the end region 6r is incident on the light receiving portion 7r (an end light receiving portion) of the light detector 7, and a light beam passing through the end region 6l is incident on the light receiving portion 7l (an end light receiving portion) of the light detector 7, respectively.

The light detector 7 outputs a light amount signal in accordance with a light amount received on each of the light receiving portions 7c, 7r, and 7l. The light amount signals are respectively input to the amplifier 8c (a central amplifier), and to the amplifiers 8r and 8l (end amplifiers). The amplifiers 8c, 8r, and 8l are gain variable amplifiers capable of varying the gain. The gain controller 8 controls the gain of each of the amplifiers 8c, 8r, and 8l. Specifically, the gains of the amplifiers 8c, 8r, and 8l are set to optimum gains Kc, Kr, and Kl by the gain controller 8. The light amount signals are amplified by the optimum gains Kc, Kr, and Kl, and then, are input to the adder 9.

The adder 9 sums up the light amount signals that are amplified by the optimum gains Kc, Kr, and Kl, and outputs an information signal. The reproduction signal processor 10 processes the information signal, and outputs a reproduction signal RF. Thus, in an information signal to be output from the adder 9, crosstalk from an adjacent track is reduced, and the error rate is reduced. This allows for the reproduction signal processor 10 to reproduce a reproduction signal RF with high precision.

Further, the reproduction signal processor 10 generates an evaluation value of the reproduction signal RF, and supplies the evaluation value to the gain controller 8. In the embodiment, for instance, iMLSE (Integrated-Maximum Likelihood Sequence Estimation) is generated as an evaluation value. iMLSE is used as an evaluation index representing the quality of a binary reproduction signal. iMLSE is an evaluation value representing the error rate correlation.

The gain controller 8 controls the gains Kc, Kr, and Kl of the amplifiers 8c, 8r, and 8l, while using iMLSE as an index in order to optimize the coefficient of the crosstalk canceller. Specifically, the gain controller 8 determines the values of the gains Kc, Kr, and Kl so that the value of iMLSE to be generated by the reproduction signal processor 10 is minimized. For instance, the gain controller 8 repeats computation of the value of iMLSE by changing the values of the gains Kc, Kr, and Kl, and selects the values of the gains Kc, Kr, and Kl that minimize the value of iMLSE.

The crosstalk cancellation effect is determined by the ratio of the gains Kc, Kr, and Kl to be given to the amplifiers 8c, 8r, and 8l. Therefore, in order to simplify the computation, the gain controller 8 determines the values of the gains Kr and Kl by setting the gain Kc=1. Using a DC value as the values of the gains Kc, Kr, and Kl may also be advantageous. However, the crosstalk cancellation effect is more advantageously obtained by giving the values of the gains Kc, Kr, and Kl as a tap coefficient of a digital filter having frequency characteristics.

For instance, preferably, the amplifiers 8c, 8r, and 8l may include a digital filter having frequency characteristics in which the gains to be given to the amplifiers 8c, 8r, and 8l by the gain controller 8 are determined by a tap coefficient, and the gain controller 8 may repeat the computation from gain initial values so that the value of iMLSE to be obtained by the reproduction signal processor 10 is minimized, and may output an optimized gain.

On the other hand, the control signal generator 11a of the control signal processor 11 receives a light beam reflected on the beam splitter 5, detects a focusing error signal and a tracking error signal, and generates a focusing control signal FoC and a tracking control signal TrC from the focusing error signal and from the tracking error signal. The focusing control signal FoC and the tracking control signal TrC are output to the objective lens actuator 12, and a focusing operation and a tracking operation of the objective lens 3 are performed. In the embodiment, the tracking pitch Tp is 0.23 μm, which is smaller than the diffraction limit of a light beam. However, the groove interval Gp is 0.46 μm. Therefore, it is possible to obtain a tracking error signal having a sufficient amplitude.

The control signal processor 11 is provided with the tracking switcher 11b. The tracking switcher 11b outputs a tracking control signal TrC generated by the control signal generator 11a to the gain controller 8. When the tracking control signal TrC is output, the tracking switcher 11b inverts the polarity of the tracking control signal TrC depending on whether the track to be scanned by the light collecting spot is the land portion L or the groove portion G of the optical disc 2.

Further, the gain controller 8 is operable to switch combinations of the gains to be set to the amplifiers 8c, 8l, and 8r, as the track to be scanned by the light collecting spot is switched between the land portion L and the groove portion G by obtaining timing information on polarity switching of the tracking control signal TrC from the tracking switcher 11b, and information for specifying whether the track to be scanned by the light collecting spot is the land portion L or the groove portion G. Specifically, when the polarity of the tracking control signal TrC is inverted, the gain controller 8 switches the gains of the amplifiers 8c, 8l, and 8r, and sets the gain of the amplifier 8c to be substantially lower than at least one of the gains of the amplifiers 8l and 8r so that crosstalk from an adjacent track of the optical disc 2 is reduced.

Therefore, although the reflectance is different between the land portion L and the groove portion G, in the embodiment, the relationship between a scanning track and an adjacent track is inverted depending on whether the scanning track is the land portion L or the groove portion G. Thus, it is possible to reduce leakage of a signal from an adjacent track, and to reduce the error rate, without losing the crosstalk cancellation effect. This makes it possible to perform recording and reproduction of an information signal with high precision.

FIG. 5 to FIG. 9E are diagrams illustrating computation results of iMLSE by the optical disc information device in the embodiment.

An actual reproduction signal includes media noise, laser noise, and amplifier noise by the amplifiers 8c, 8r, and 8l, in addition to crosstalk noise. In particular, amplifier noise of the amplifiers 8r and 8l is multiplied by Kr and Kl. Therefore, an actual reproduction signal is disadvantageous with respect to amplifier noise, as the area of the end regions 6r and 6l decreases, in other words, as the area of the central region 6c increases. FIG. 5 to FIG. 9E illustrate computation results of iMLSE, taking into consideration the aforementioned various noises.

Figure 5:
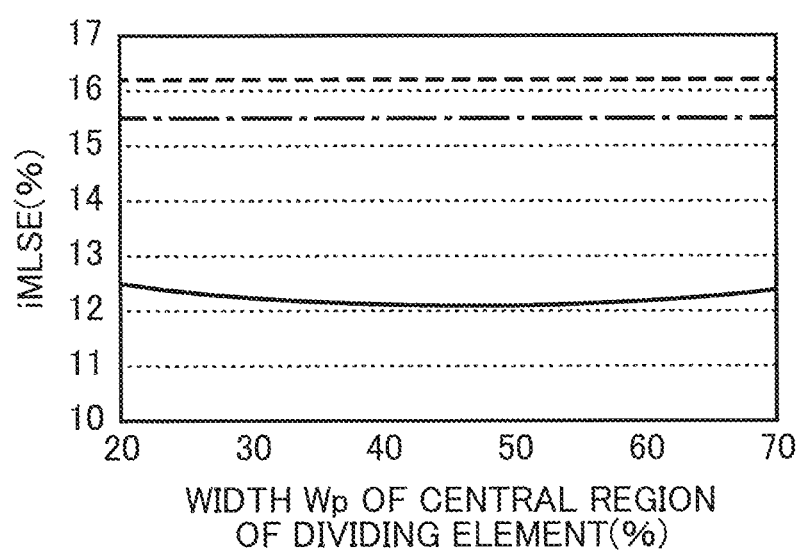
FIG. 5 is a diagram illustrating a computation result of iMLSE with respect to the width of a central region of the dividing element of the optical disc information device in the first embodiment of the invention.

FIG. 5 illustrates a computation result of iMLSE with respect to the width Wp of the central region 6c of the dividing element 6. The vertical axis indicates a value of iMLSE (unit: %), and the horizontal axis indicates the width Wp (unit: %) of the central region 6c of the dividing element 6.

In the embodiment, the width Wp of the central region 6c of the dividing element 6 is 45%, the width Ws of the central region 16c of the transmittance limiting element 16 is 45%, and the transmittance of the end regions 16r and 16l of the transmittance limiting element 16 is 85%. Computation is also performed in the other condition for explanation.

In FIG. 5, the track pitch Tp of the optical disc 2 is 0.23 µm, the wavelength λ of the blue semiconductor laser unit 1 is 0.405 µm, the numerical aperture NA of the objective lens 3 is 0.85, and the value of iMLSE with respect to each width Wp of the central region 6c (the curve indicated by the solid line in FIG. 5) is a value calculated by applying a crosstalk canceller, setting the gain Kc to 1, and giving optimum gains Kl and Kr. As the width Ws of the central region 16c of the transmittance limiting element 16 and the transmittance of the end regions 16r and 16l, values that enable to obtain a minimum value of iMLSE with respect to the width Wp of the central region 6c of the dividing element 6 are used, and each of the computation results is illustrated.

Further, in FIG. 5 to FIG. 9E, and in FIG. 24 to be described later, the one-dotted chain lines in these drawings indicate values of reproduction limit of the optical disc 2. The values indicated by the broken lines in FIG. 5 to FIG. 7 indicate computation results when a crosstalk canceller is not applied in the condition of the embodiment (Tp=0.23 µm, λ=0.405 µm, and NA=0.85).

As is clear from FIG. 5, the value of iMLSE is remarkably improved from the value when a crosstalk canceller is not applied as indicated by the broken line by applying a crosstalk canceller in the condition of the embodiment. Thus, a sufficient margin is obtained with respect to reproduction limit of the optical disc 2 (indicated by the one-dotted chain line). Therefore, the embodiment is advantageous in obtaining a reproduction signal of good quality.

Further, in the embodiment, it is possible to obtain a minimum value of iMLSE when the width Wp of the central region 6c of the dividing element 6 is near 45%. Therefore, preferably, the width Wp of the central region 6c may be within 45%±15% of the diameter of a light beam (the width of a light flux). In this case, the variation of the value of iMLSE is about 0.1%, and it is possible to minimize the value of iMLSE. Thus, the embodiment is advantageous in obtaining a reproduction signal of better quality.

Figure 6A:
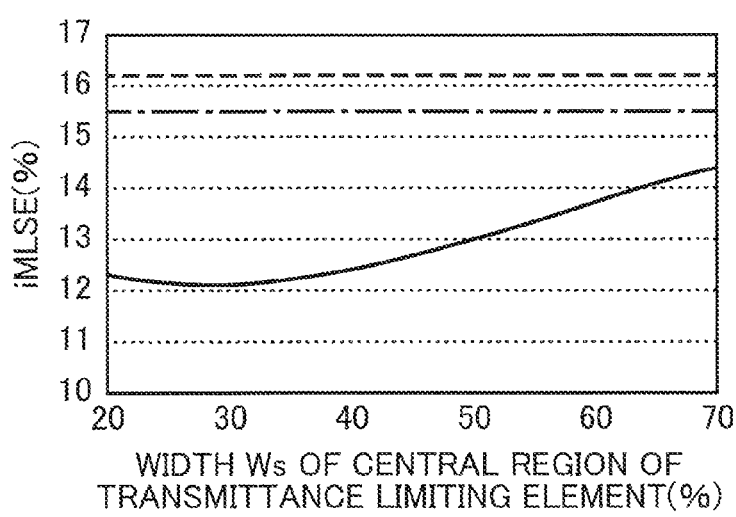
FIG. 6A is a diagram illustrating a computation result of iMLSE with respect to the width of a central region of the transmittance limiting element when the width of the central region of the dividing element in the first embodiment of the invention is 35%.
Figure 6B:
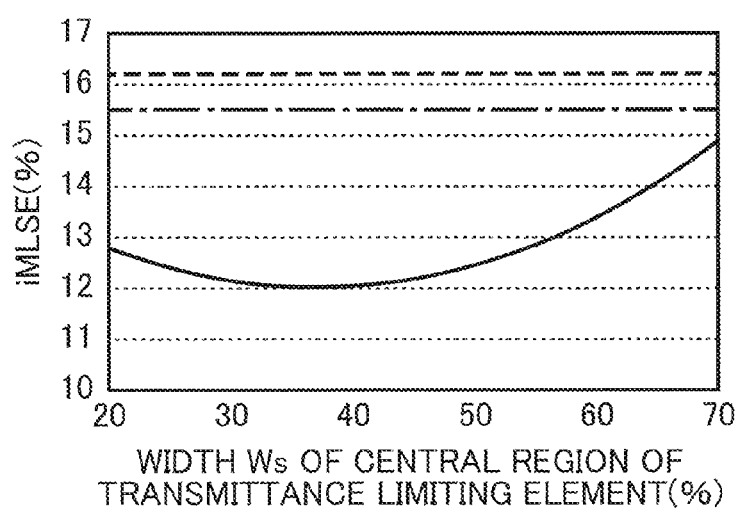
FIG. 6B is a diagram illustrating a computation result of iMLSE with respect to the width of the central region of the transmittance limiting element when the width of the central region of the dividing element in the first embodiment of the invention is 40%.
Figure 6C:
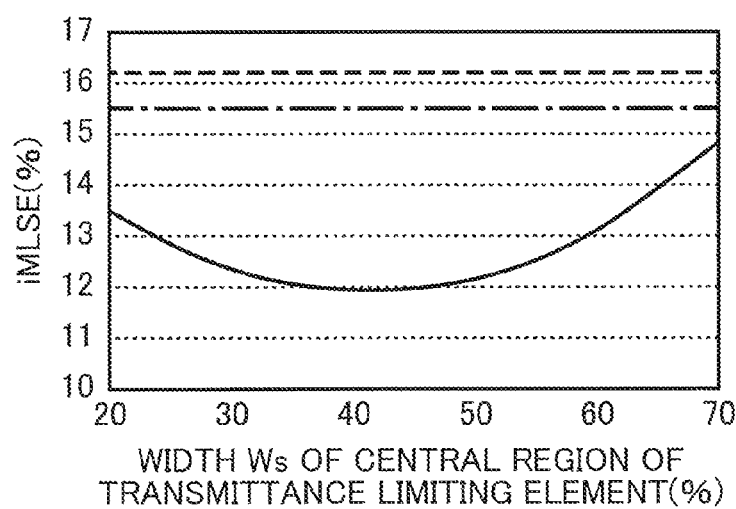
FIG. 6C is a diagram illustrating a computation result of iMLSE with respect to the width of the central region of the transmittance limiting element when the width of the central region of the dividing element in the first embodiment of the invention is 45%.

FIG. 6A illustrates a computation result of iMLSE with respect to the width Ws of the central region 16c of the transmittance limiting element 16 when the width Wp of the central region 6c of the dividing element 6 is 35%. FIG. 6B illustrates a computation result of iMLSE with respect to the width Ws of the central region 16c of the transmittance limiting element 16 when the width Wp of the central region 6c of the dividing element 6 is 40%. FIG. 6C illustrates a computation result of iMLSE with respect to the width Ws of the central region 16c of the transmittance limiting element 16 when the width Wp of the central region 6c of the dividing element 6 is 45%.

In each of the drawings, the vertical axis indicates a value of iMLSE (unit: %), and the horizontal axis indicates the width Ws (unit: %) of the central region 16c of the transmittance limiting element 16.

In the embodiment, the width Wp of the central region 6c of the dividing element 6 is 45%, the width Ws of the central region 16c of the transmittance limiting element 16 is 45%, and the transmittance of the end regions 16r and 16l of the transmittance limiting element 16 is 85%. Computation is also performed in the other condition for explanation.

In FIG. 6A to 6C, the track pitch Tp of the optical disc 2 is 0.23 µm, the wavelength λ of the blue semiconductor laser unit 1 is 0.405 µm, the numerical aperture NA of the objective lens 3 is 0.85, and the value of iMLSE with respect to the width Ws of each central region 6c (the curve indicated by the solid line in the drawings) is a value calculated by setting the gain Kc to 1 and by giving the optimum gains Kl and Kr.

Further, as the transmittance of the end regions 16r and 16l of the transmittance limiting element 16, a transmittance that enables to obtain a minimum value of iMLSE with respect to the width Wp of each central region 6c of the dividing element 6 is used, and each of the computation results is illustrated. Further as described above, the one-dotted chain line in each of the drawings illustrates a value of reproduction limit of the optical disc 2. The values indicated by the broken lines illustrate computation results when a crosstalk canceller is not applied in the condition of the embodiment (Tp=0.23 µm, λ=0.405 µm, and NA=0.85).

As is clear from FIG. 6A to 6C, the width Ws of the central region 16c of the transmittance limiting element 16 has a correlation with respect to the width Wp of the central region 6c of the dividing element 6. When the widths Ws and Wp are approximate to each other, it is possible to obtain a minimum value of iMLSE. Therefore, preferably, the difference between the ratio of the width Wp of the central region 6c of the dividing element 6 with respect to the diameter of a light beam, and the ratio of the width Ws of the central region 16c of the transmittance limiting element 16 with respect to the diameter of the light beam may be within ±15%. In this case, most efficient crosstalk cancellation effect is obtained, and it is possible to obtain a reproduction signal of better quality.

Figure 7:
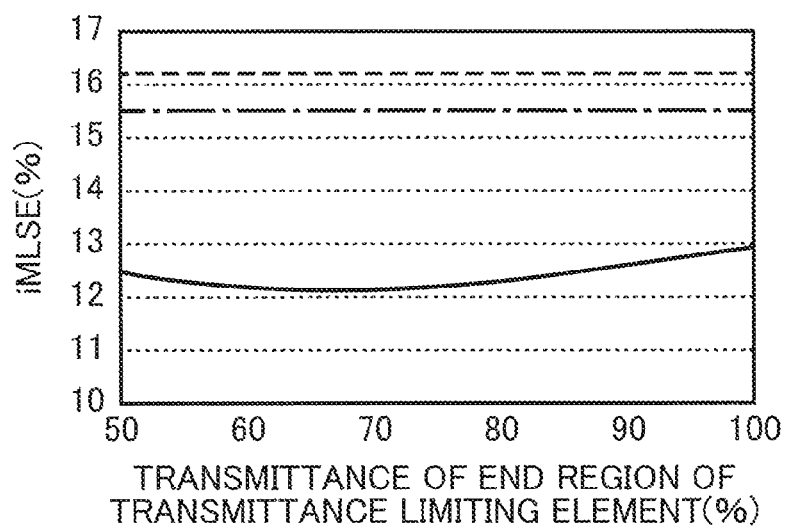
FIG. 7 is a diagram illustrating a computation result of iMLSE with respect to the transmittance of an end region of the transmittance limiting element when the width of the central region of the dividing element is 45% and when the width of the central region of the transmittance limiting element is 45% in the first embodiment of the invention.

Next, FIG. 7 illustrates a computation result of iMLSE with respect to the transmittances of the end regions 16r and 16l of the transmittance limiting element 16 (the curve indicated by the solid line in FIG. 7) when the width Wp of the central region 6c of the dividing element 6 is 45%, and the width Ws of the central region 16c of the transmittance limiting element 16 is 45%.

The vertical axis indicates a value of iMLSE (unit: %), and the horizontal axis indicates a transmittance (unit: %) of the end regions 16r and 16l of the transmittance limiting element 16.

In the embodiment, the width Wp of the central region of the dividing element 6 is 45%, the width Ws of the central region 16c of the transmittance limiting element 16 is 45%, and the transmittance of the end regions 16r and 16l of the transmittance limiting element 16 is 85%. Computation is also performed in the other condition for explanation.

As is clear from FIG. 7, it is possible to obtain a minimum value of iMLSE when the transmittance of the end regions 16r and 16l is near 70%. Therefore, preferably, the transmittance of the end regions 16r and 16l may be not smaller than 50% but not larger than 90%, and more preferably, not smaller than 60% but not larger than 80%. In this case, it is possible to obtain most efficient crosstalk cancellation effect with respect to reproduction limit of the optical disc 2 as illustrated in FIG. 7 (one-dotted chain line), and to obtain a reproduction signal of better quality.

As far as the parameters are in the aforementioned ranges, it is possible to sufficiently reduce crosstalk from an adjacent track of the optical disc 2, and to obtain a reproduction signal of sufficiently good quality. As the width of a light flux (the diameter of a light beam), it is possible to use the diameter of an opening portion of an aperture (not illustrated), which is disposed between the objective lens 3 and the laser mirror 4, as a reference.

Next, a case is described when the optical disc 2 is tilted, and tilt with respect to the optical axis of the objective lens 3 has occurred.

When the optical disc 2 is tilted, and tilt has occurred with respect to the optical axis of the objective lens 3, a tilt amount of the optical disc 2 is detected by the tilt detector 14. The value of the detected tilt amount is given to the gain controller 8. The gain controller 8 outputs predetermined gain initial values to the amplifiers 8c, 8r, and 8l in accordance with the tilt amount. Light amount signals amplified by the amplifiers 8c, 8r, and 8l are output to the reproduction signal processor 10 via the adder 9. The reproduction signal processor 10 computes the value of iMLSE, and returns the computed value of iMLSE to the gain controller 8. This loop is repeated, and the gain controller 8 selects the values of the gains Kc, Kr, and Kl that minimize the value of iMLSE.

Thus, in an information signal to be output from the adder 9, crosstalk from an adjacent track is reduced, and the error rate is reduced. This allows for the reproduction signal processor 10 to reproduce a reproduction signal RF with high precision.

Further, it is possible to shorten the repetitive computation time required for minimizing the value of iMLSE by using predetermined gain initial values in accordance with a tilt amount.

It is possible to use e.g. a reflective photoreflector as the tilt detector 14. Alternatively, there is a method, in which a focusing operation is performed within a predetermined radial position of the optical disc 2, and a tilt of the optical disc 2 is estimated from a focus offset amount of the objective lens actuator 12. This method makes it possible to implement the function of the tilt detector 14, without adding a component such as a sensor.

Figure 8:
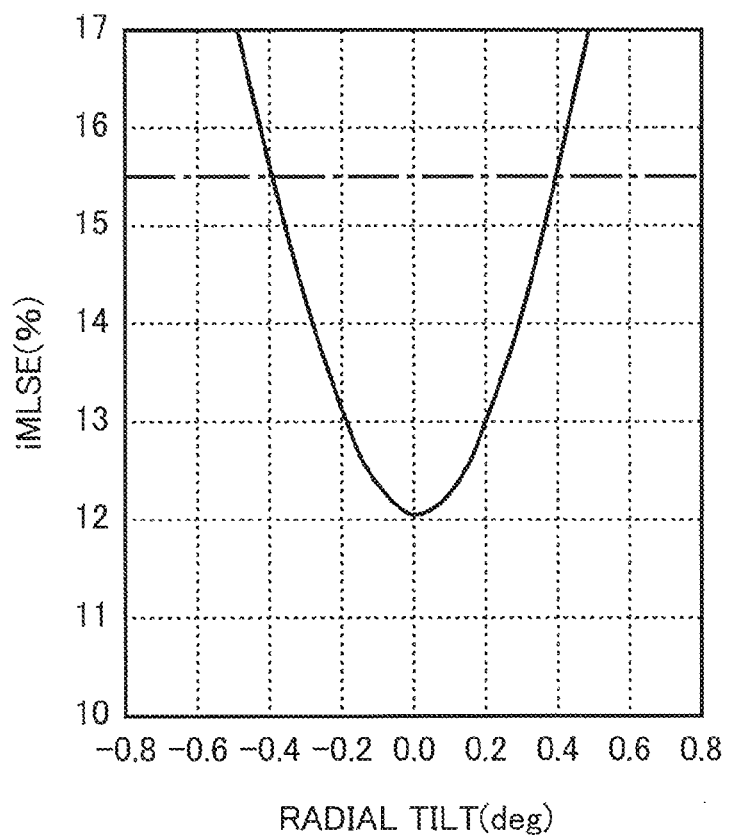
FIG. 8 is a diagram illustrating a computation result of iMLSE when tilt has occurred in the optical disc information device in the first embodiment of the invention.

FIG. 8 is a diagram illustrating a computation result of iMLSE when tilt has occurred in the optical disc information device in the first embodiment of the invention.

In FIG. 8, the vertical axis indicates a value of iMLSE (unit: %), and the horizontal axis indicates a radial tilt amount (unit: degree). The curve indicated by the solid line in FIG. 8 indicates a computation result when a crosstalk canceller is applied in the condition of the embodiment (Tp=0.23 μm, λ=0.405 μm, and NA=0.85). Further, the one-dotted chain line in FIG. 8 indicates a value of reproduction limit of the optical disc 2.

As illustrated in FIG. 8, it is possible to obtain an allowable range of radial tilt of ±0.4 deg with respect to reproduction limit of the optical disc 2. It is clear that sufficient crosstalk cancellation effect is obtained. In the aforementioned computation, the gain Kc=1, and optimum magnifications i.e. gains Kr and Kl are selectively given in accordance with each of the tilt amounts.

A method for controlling the gains Kc, Kr, and Kl in accordance with a tilt amount is not specifically limited to the aforementioned example. As another method, there is proposed a method, in which gain initial values set in accordance with a tilt amount are selected as magnifications of gains Kc, Kr, and Kl, and crosstalk cancellation is performed without optimizing the gains Kc, Kr, and Kl. In this case, although precision of crosstalk cancellation may be lowered, crosstalk cancellation effect sufficient for reproduction is secured, and the configuration is simplified. This is advantageous in increasing the response speed.

Next, a case is described, in which lens shift has occurred in the objective lens 3.

When lens shift has occurred in the objective lens 3, a lens shift amount of the objective lens 3 is detected by the lens shift detector 15. The lens shift detector 15 receives a tracking control signal TrC from the control signal generator 11a of the control signal processor 11, and outputs a signal calculated by amplifying the DC component of the tracking control signal TrC by an appropriate gain to the gain controller 8, as a lens shift amount.

The gain controller 8 outputs predetermined gain initial values to the amplifiers 8c, 8r, and 8l in accordance with a lens shift amount. Light amount signals amplified by the amplifiers 8c, 8r, and 8l are output to the reproduction signal processor 10 via the adder 9. The reproduction signal processor 10 computes the value of iMLSE, and returns the computed value of iMLSE to the gain controller 8. This loop is repeated, and the gain controller 8 selects the values of gains Kc, Kr, and Kl that minimize the value of iMLSE.

Thus, in an information signal to be output from the adder 9, crosstalk from an adjacent track is reduced, and the error rate is reduced. This allows for the reproduction signal processor 10 to reproduce a reproduction signal RF with high precision.

Further, it is possible to shorten the repetitive computation time required for minimizing the value of iMLSE by using predetermined gain initial values in accordance with a lens shift amount.

FIGS. 9A to 9E are diagrams illustrating computation results of iMLSE when lens shift has occurred in the optical disc information device in the first embodiment of the invention.

In FIGS. 9A to 9E, the vertical axis indicates a value of iMLSE (unit: %), and the horizontal axis indicates a lens shift amount (unit: mm). In the embodiment, the width Wp of the central region 6c of the dividing element 6 is 45%, the width Ws of the central region 16c of the transmittance limiting element 16 is 45%, and the transmittance of the end regions 16r and 16l of the transmittance limiting element 16 is 85%. Computation is also performed in the other condition for explanation.

Figure 9A:
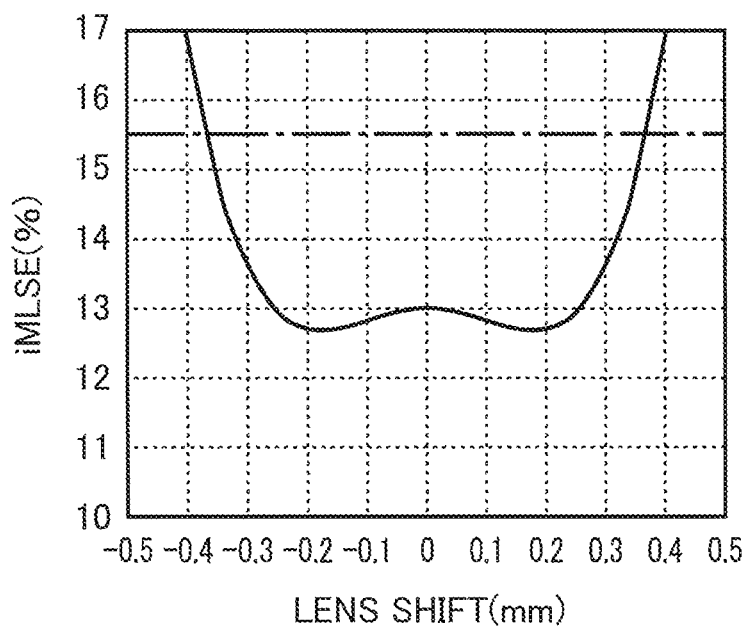
FIG. 9A is a diagram illustrating a computation result of iMLSE when lens shift has occurred in the optical disc information device in the first embodiment of the invention.

FIG. 9A illustrates a computation result of iMLSE with respect to a lens shift (the curve indicated by the solid line in FIG. 9A) when the width Wp of the central region 6c of the dividing element 6 is 45%, the width Ws of the central region 16c of the transmittance limiting element 16 is 45%, and the transmittance of the end regions 16r and 16l of the transmittance limiting element 16 is 100%.

Figure 9B:
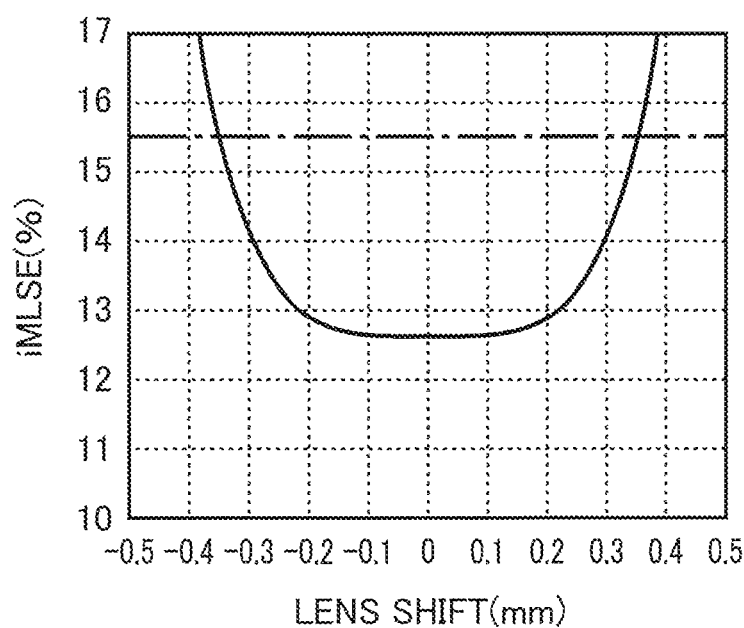
FIG. 9B is a diagram illustrating a computation result of iMLSE when lens shift has occurred in the optical disc information device in the first embodiment of the invention.

FIG. 9B illustrates a computation result of iMLSE with respect to a lens shift (the curve indicated by the solid line in FIG. 9B) when the width Wp of the central region 6c of the dividing element 6 is 45%, the width Ws of the central region 16c of the transmittance limiting element 16 is 45%, and the transmittance of the end regions 16r and 16l of the transmittance limiting element 16 is 90%.

Figure 9C:
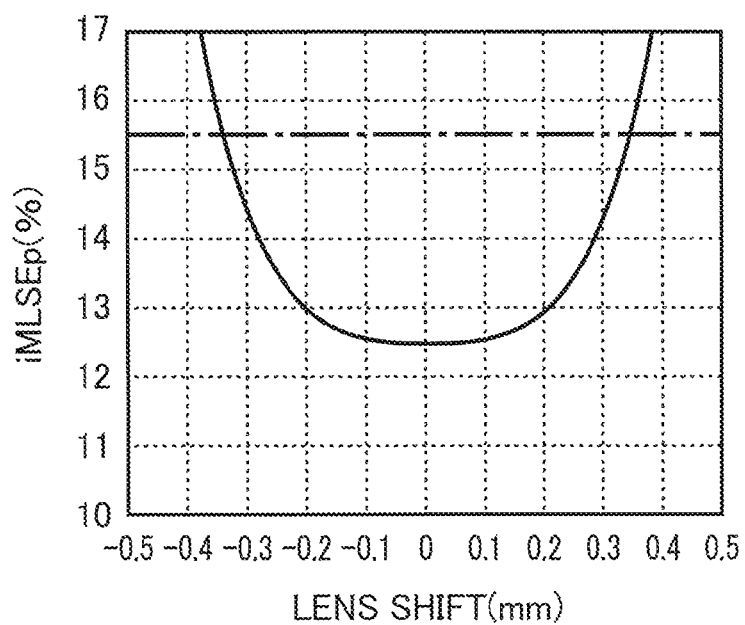
FIG. 9C is a diagram illustrating a computation result of iMLSE when lens shift has occurred in the optical disc information device in the first embodiment of the invention.

FIG. 9C illustrates a computation result of iMLSE with respect to a lens shift (the curve indicated by the solid line in FIG. 9C) when the width Wp of the central region 6c of the dividing element 6 is 45%, the width Ws of the central region 16c of the transmittance limiting element 16 is 45%, and the transmittance of the end regions 16r and 16l of the transmittance limiting element 16 is 85%.

Figure 9D:
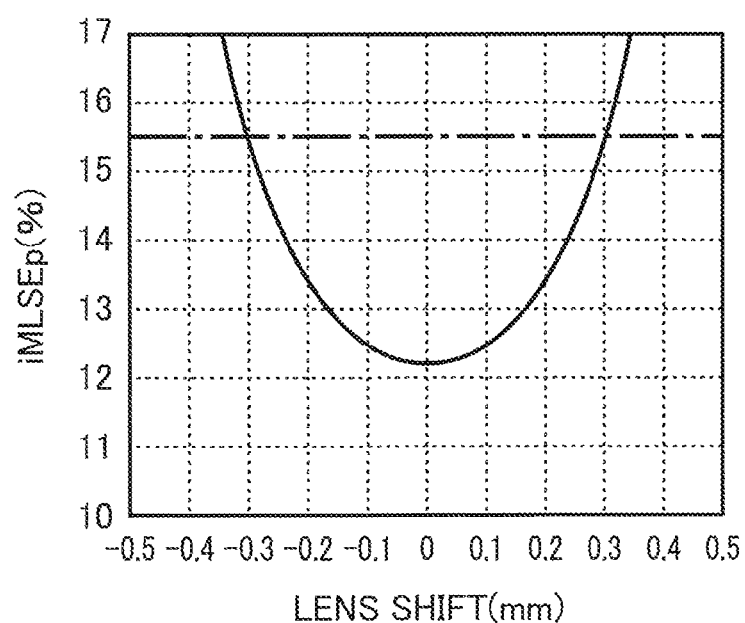
FIG. 9D is a diagram illustrating a computation result of iMLSE when lens shift has occurred in the optical disc information device in the first embodiment of the invention.

FIG. 9D illustrates a computation result of iMLSE with respect to a lens shift (the curve indicated by the solid line in FIG. 9D) when the width Wp of the central region 6c of the dividing element 6 is 45%, the width Ws of the central region 16c of the transmittance limiting element 16 is 45%, and the transmittance of the end regions 16r and 16l of the transmittance limiting element 16 is 70%.

Figure 9E:
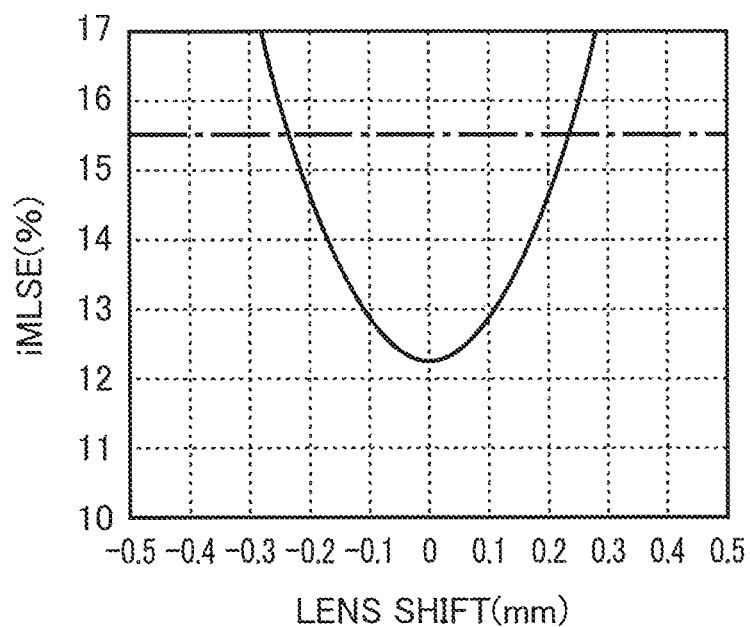
FIG. 9E is a diagram illustrating a computation result of iMLSE when lens shift has occurred in the optical disc information device in the first embodiment of the invention.

FIG. 9E illustrates a computation result of iMLSE with respect to a lens shift (the curve indicated by the solid line in FIG. 9E) when the width Wp of the central region 6c of the dividing element 6 is 45%, the width Ws of the central region 16c of the transmittance limiting element 16 is 45%, and the transmittance of the end regions 16r and 16l of the transmittance limiting element 16 is 50%.

FIG. 9A is equivalent to a state that the transmittance limiting element 16 is not present, because the transmittance of the end regions 16r and 16l of the transmittance limiting element 16 is 100%.

As described above using FIG. 7, as the transmittance of the end regions 16r and 16l is lowered, the value of iMLSE is improved when the lens shift amount is 0 mm, and a minimum value of iMLSE is obtained when the transmittance is near 70%. When the transmittance is further lowered, however, the value of iMLSE increases.

Concurrently, as is clear from FIGS. 9A to 9E, as the transmittance of the end regions 16r and 16l of the transmittance limiting element 16 is lowered, the allowable range of lens shift with respect to reproduction limit of the optical disc 2 (indicated by the one-dotted chain line) is reduced. Further, when the transmittance of the end regions 16r and 16l is 85% and 90%, it is possible to secure a lens shift range that does not change the value of iMLSE. This is advantageous in reducing the assembling variation and the characteristics variation during an operation. Thus, combining the width Wp of the central region 6c of the dividing element 6, the width Ws of the central region 16c of the transmittance limiting element 16, and the value of transmittance of the end regions 16r and 16l of the transmittance limiting element 16 in various ways is advantageous in obtaining intended optimum characteristics.

Reducing the rim intensity in the radial direction R of the blue semiconductor laser unit 1, in place of using the transmittance limiting element 16, makes it possible to obtain substantially the same advantageous effects as described above. However, in the transmittance limiting element 16, whereas the intensity distribution of a light beam in the radial direction is discontinuously changed, the rim intensity is continuously changed when the rim intensity is adjusted. As a result, the degree of improvement of the value of iMLSE may be lowered when the lens shift amount is 0 mm.

Further, when the rim intensity of the blue semiconductor laser unit 1 is reduced, it is difficult to reduce the rim intensity only in the radial direction R. The rim intensity may be concurrently reduced in the tangential direction. This may deteriorate the frequency characteristics of a reproduction signal, and may lower the resolution in the linear direction of the optical disc 2.

Therefore, use of the transmittance limiting element 16 is advantageous in implementing high-precision crosstalk cancellation without deteriorating frequency characteristics of a reproduction signal, improving the value of iMLSE when the lens shift amount is 0 mm, and obtaining a reproduction signal of better quality.

A method for controlling the gains Kc, Kr, and Kl in accordance with a lens shift amount is not specifically limited to the aforementioned example. As another method, there is proposed a method, in which gain initial values set in accordance with a lens shift amount are selected as magnifications of gains Kc, Kr, and Kl, and crosstalk cancellation is performed without optimizing the gains Kc, Kr, and Kl. In this case, although precision of crosstalk cancellation may be lowered, crosstalk cancellation effect sufficient for reproduction is secured, and the configuration is simplified. This is advantageous in increasing the response speed.

Next, a case is described, in which off track such that a light collecting spot is off the scanning track of the optical disc 2 has occurred.

When off track such that a light collecting spot is off the scanning track has occurred, an off track amount is detected by the control signal generator 11a of the control signal processor 11. The value of the detected off track amount is given to the gain controller 8. The gain controller 8 outputs predetermined gain initial values to the amplifiers 8c, 8r, and 8l in accordance with the detected off track amount. Light amount signals amplified by the amplifiers 8c, 8r, and 8l are output to the reproduction signal processor 10 via the adder 9. The reproduction signal processor 10 computes the value of iMLSE, and returns the computed value of iMLSE to the gain controller 8. This loop is repeated, and the gain controller 8 selects the values of the gains Kc, Kr, and Kl that minimize the value of iMLSE.

Thus, in an information signal to be output from the adder 9, crosstalk from an adjacent track is reduced, and the error rate is reduced. This allows for the reproduction signal processor 10 to reproduce a reproduction signal RF with high precision.

Further, it is possible to shorten the repetitive computation time required for minimizing the value of iMLSE by using predetermined gain initial values in accordance with a tilt amount.

Further, it is possible to optionally combine the control method based on a tilt amount, the control method based on a lens shift amount, and the control method based on an off track amount. For instance, when tilt of the optical disc 2 and lens shift of the objective lens 3 have concurrently occurred, the gain controller 8 may output optimum gain initial values to the amplifiers 8c, 8r, and 8l in accordance with a combination of a tilt amount to be obtained from the tilt detector 14, and a lens shift amount to be obtained from the lens shift detector 15. In this case, light amount signals amplified by the amplifiers 8c, 8r, and 8l are output to the reproduction signal processor 10 via the adder 9. The reproduction signal processor 10 computes the value of iMLSE, and returns the computed value of iMLSE to the gain controller 8. This loop is repeated, and the gain controller 8 selects the values of the gains Kc, Kr, and Kl that minimize the value of iMLSE.

Thus, in an information signal to be output from the adder 9, crosstalk from an adjacent track is reduced, and the error rate is reduced. This allows for the reproduction signal processor 10 to reproduce a reproduction signal RF with high precision.

Further, it is possible to shorten the repetitive computation time required for minimizing the value of iMLSE by using predetermined gain initial values in accordance with a lens shift amount.

The reflectance is different between the land portion L and the groove portion G of the optical disc 2, and the phase of a light beam of reflected light is also different between the land portion L and the groove portion G. As a result, the relationship between a scanning track and an adjacent track may be inverted depending on whether the scanning track is the land portion L or the groove portion G, and the crosstalk cancellation effect may be lost.

In view of the above, in the embodiment, the gain controller 8 obtains timing information on polarity switching of a tracking control signal TrC from the tracking switcher 11b, and information for specifying whether the track to be scanned by the light collecting spot is the land portion L or the groove portion G so as to set gain initial values different from each other to the amplifiers 8c, 8r, and 8l in accordance with determination as to whether the track to be scanned by the light collecting spot is the land portion L or the groove portion G.

Thereafter, the light amount signals amplified by the amplifiers 8c, 8r, and 8l are output to the reproduction signal processor 10 via the adder 9. The reproduction signal processor 10 computes the value of iMLSE and returns the computed value of iMLSE to the gain controller 8. This loop is repeated, and the gain controller 8 selects the values of the gains Kc, Kr, and Kl that minimize the value of iMLSE. In this way, using predetermined gain initial value depending on whether the scanning track is the land portion L or the groove portion G makes it possible to shorten the repetitive computation time required for minimizing the value of iMLSE.

Thus, it is possible to switch the combination of magnifications i.e. the gains Kc, Kr, and Kl to be generated by the gain controller 8, as the scanning track is switched between the land portion L and the groove portion G. Each of the outputs obtained by combination of magnifications of the gains Kc, Kr, and Kl is output to the adder 9. Thus, in an information signal to be output from the adder 9, crosstalk from an adjacent track is reduced, and the error rate is reduced. This allows for the reproduction signal processor 10 to reproduce a reproduction signal RF with high precision.

The crosstalk cancellation effect is determined by the ratio of the gains Kc, Kr, and Kl to be given to the amplifiers 8c, 8r, and 8l. Therefore, to simplify the computation, the gain controller 8 sets that the gain Kc=1, and sets the gain initial value for a land portion and the gain initial value for a groove portion as the values of the gains Kr and Kl.

Setting a DC value as the values of the gains Kr and Kl may also be advantageous. However, giving the values of the gains Kr and Kl as a tap coefficient of a digital filter having frequency characteristics is more advantageous. In this case, crosstalk and media noise are different between the land portion L and the groove portion G in accordance with a disc format (such as the ratio between the land width and the groove width, or the groove depth). Therefore, an optimum tap coefficient may vary.

Figure 10:
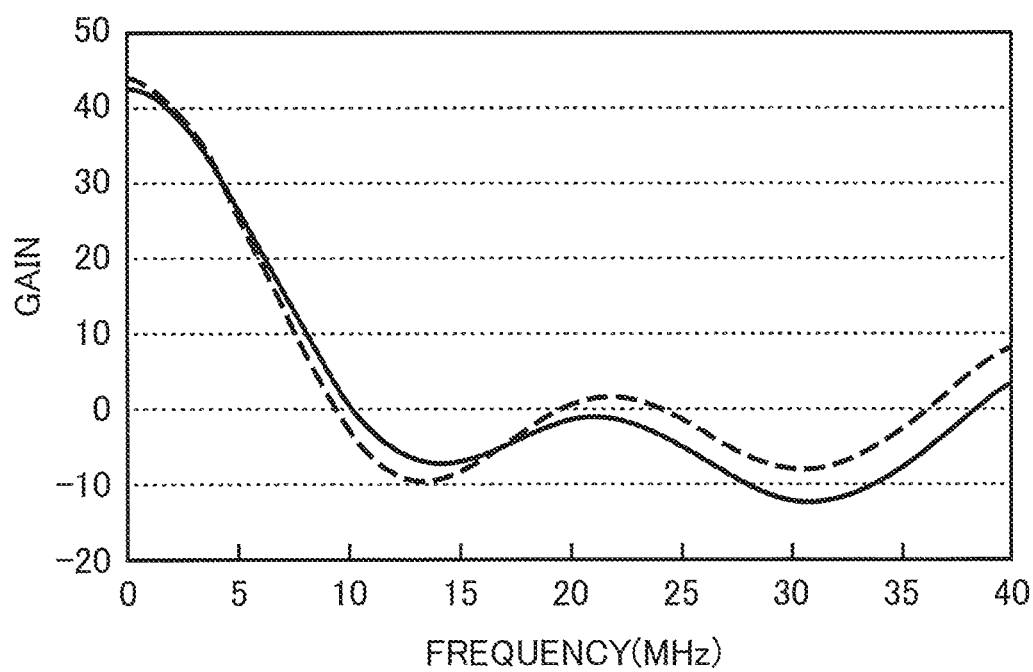
FIG. 10 is a diagram illustrating an example of frequency characteristics of a digital filter using a gain initial value for a land portion and a gain initial value for a groove portion of the optical disc information device in the first embodiment of the invention.

FIG. 10 is a diagram illustrating an example of frequency characteristics of a digital filter using a gain initial value for a land portion and a gain initial value for a groove portion of the optical disc information device in the first embodiment of the invention. In FIG. 10, the broken line indicates frequency characteristics of a digital filter when the gain Kr (when Kr=Kl) is given to the land portion L as an optimum tap coefficient, and the solid line indicates frequency characteristics of a digital filter when the gain Kr (when Kr=Kl) is given to the groove portion G as an optimum tap coefficient.

The gain controller 8 sets a gain initial value for a land portion and a gain initial value for a groove portion as the gains Kc, Kr, and Kl, as the scanning track is switched between the land portion L and the groove portion G so that the amplifiers 8c, 8r, and 8l function as the aforementioned digital filter having frequency characteristics.

Specifically, the gain controller 8 stores in advance a gain initial value for a land portion and a gain initial value for a groove portion, which are different from each other. When a track to be scanned by a light collecting spot is a land portion and the polarity of the tracking control signal TrC is inverted, the gain initial value for a land portion is set in the amplifiers 8c, 8r, and 8l. When a track to be scanned by a light collecting spot is a groove portion and the polarity of the tracking control signal TrC is inverted, the gain initial value for a groove portion is set in the amplifiers 8c, 8r, and 8l.

As described above, preparing in advance an initial value of a tap coefficient to be applied to each of the land portion L and the groove portion G as a gain initial value for a land portion and as a gain initial value for a groove portion, and starting optimization computation using these tap coefficients when reproduction is switched between the land portion L and the groove portion G is advantageous in shortening the optimization time.

Further, in the embodiment, the optical disc 2 is an optical disc configured such that information is recorded in the land portion L and in the groove portion G of a groove, and is an optical disc, in which the groove interval Gp=0.46 μm and the track pitch Tp=0.23 μm. The groove interval Gp is not specifically limited to this example. As far as the requirement: $(Gp/2)<\lambda/(2 \cdot NA)$ is satisfied, substantially the same advantageous effects as described above can be obtained regardless that the groove interval Gp is different from the above. Further, as far as the requirement: $(Gp/2)<(1.2 \cdot \lambda)/(2 \cdot NA)$ is satisfied, substantially the same advantageous effects as described above can be sufficiently obtained regardless that the groove interval Gp is different from the above.

Further, in the optical disc information device in the embodiment, it is possible to compatibly record and reproduce with respect to optical discs having groove intervals of different types, in place of recording and reproducing with respect to an optical disc having a groove interval Gp of one type, with use of one device.

In this case, for instance, the reproduction signal processor 10 extracts information of the track pitch Tp from the disc information that is recorded in advance in the optical disc 2, and outputs the extracted information to the gain controller 8. The gain controller 8 sets the gains Kc, Kr, and Kl different from each other to the amplifiers 8c, 8r, and 8l in accordance with the track pitch Tp of the optical disc 2.

In this way, switching the combination of magnifications of the gains Kc, Kr, and Kl to be generated by the gain controller 8 in accordance with the groove interval Gp of the optical disc 2 to be recorded and reproduced makes it possible to reduce crosstalk, even when optical discs having groove intervals different from each other are used. Thus, each of the outputs obtained by combination of magnifications of the gains Kc, Kr, and Kl is input to the adder 9. In an information signal, crosstalk from an adjacent track is reduced, and the error rate is reduced. This allows for the reproduction signal processor 10 to reproduce a reproduction signal RF with high precision.

In the embodiment, Kc=1 (one time), and Kr=Kl, as the values of the gains Kc, Kr, and Kl of the amplifiers 8c, 8r, and 8l. Thus, optimized gain values are given to Kr and Kl. It is, however, not necessarily Kr=Kl. As far as an optimum value is selected for each of Kr and Kl, it is possible to reduce crosstalk with high precision.

Further, the transmittance limiting element usable in the embodiment is not specifically limited to the transmittance limiting element 16. For instance, it is possible to use a transmittance limiting element as described below.

Figure 11:
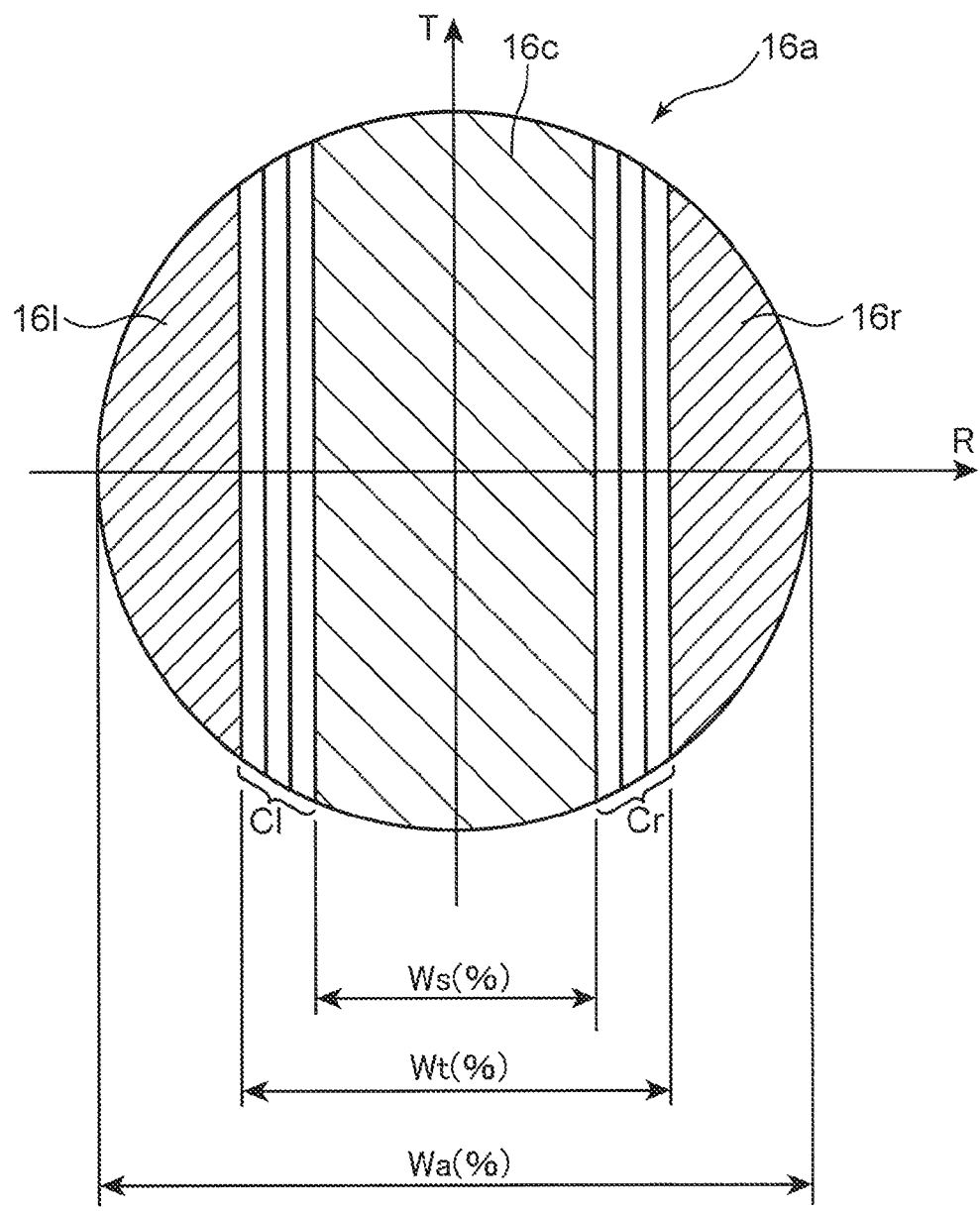
FIG. 11 is a schematic diagram illustrating a regional configuration of another transmittance limiting element for use in the optical disc information device illustrated in FIG. 1.
Figure 12:
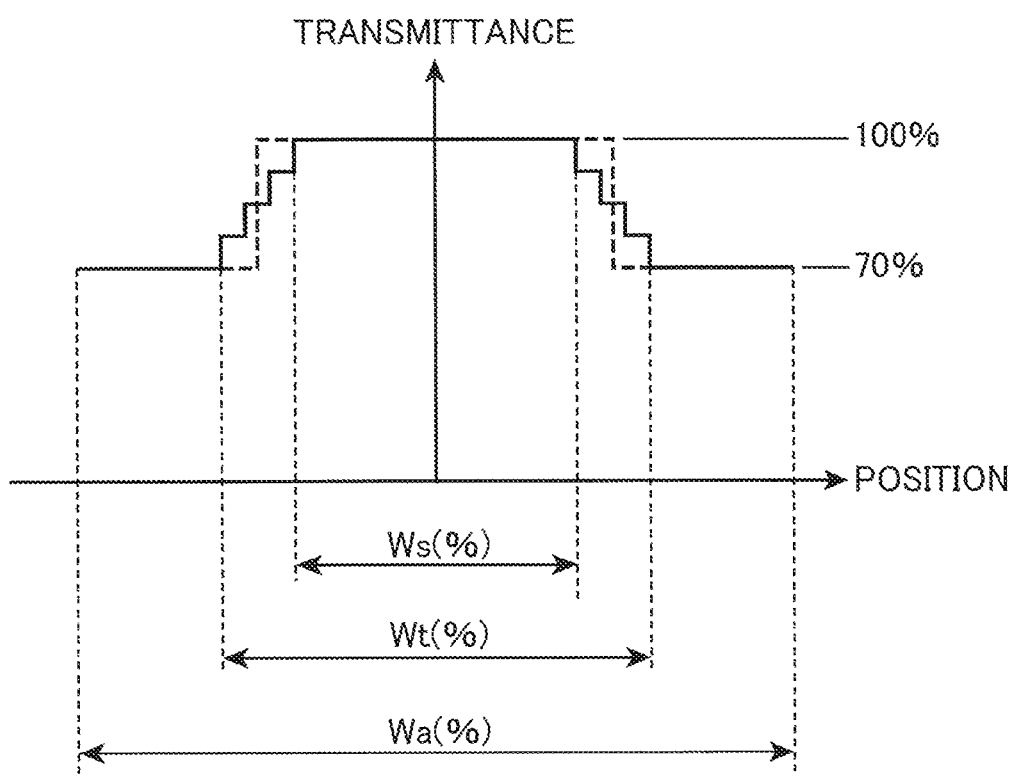
FIG. 12 is a diagram illustrating transmittance characteristics of the transmittance limiting element illustrated in FIG. 11.

FIG. 11 is a schematic diagram illustrating a regional configuration of another transmittance limiting element for use in the optical disc information device illustrated in FIG. 1. FIG. 12 is a diagram illustrating transmittance characteristics of the transmittance limiting element illustrated in FIG. 11.

As described above, in the embodiment, the transmittance of the boundary between the central region 16c, and each of the two end regions 16r and 16l is configured to change in a rectangular shape. For instance, as illustrated in FIG. 11 and FIG. 12, a transient region Cr having an intended width may be formed between a central region 16c and an end region 16r, and a transient region Cl having an intended width may be formed between the central region 16c and an end region 16l in such a manner that the transmittance is stepwise changed in the transient regions Cr and Cl.

Specifically, for instance, a transmittance limiting element 16a illustrated in FIG. 11 is divided into five regions along directions associated with the radial direction R of the optical disc 2. The transmittance limiting element 16a is divided into the central region 16c, the two transient regions Cr and Cl which interpose the central region 16c therebetween, and the two end regions 16r and 16l which interpose the central region 16c therebetween via the transient regions Cr and Cl.

Further, in the radial direction R, the width Ws of the central region 16c is about 40% of the diameter of a light beam. The width Wt of the region obtained by joining the central region 16c and the transient regions Cr and Cl is about 60% of the diameter of the light beam, and the width Wa of the entire region obtained by joining the central region 16c, the transient regions Cr and Cl, and the end regions 16t and 16l is about 100% of the diameter of the light beam.

As illustrated in FIG. 12, regarding the transmittance of each of the regions, for instance, the transmittance of the central region 16c is 100%, and the transmittance of the end regions 16r and 16l is 70%. The transmittance of the zones between the central region 16c and each of the end regions 16r and 16l, namely, the transmittance of the transient regions Cr and Cl is stepwise changed in the region from about 40% to about 60% of the diameter of a light beam. For instance, the transmittance of the transient regions Cr and Cl is changed from 70% to 100% by four steps.

In this way, the transient regions Cr and Cl are disposed between the central region 16c, and each of the end regions 16r and 16l, and the transmittance of the transient regions Cr and Cl is stepwise and gradually changed. This makes it possible to prevent a sharp change in signal amplitude, even when lens shift has occurred in the objective lens 3. This makes it possible to stably perform position control of the objective lens 3.

The configuration of changing the transmittance of the transient regions Cr and Cl is not specifically limited to the aforementioned example. As far as the transmittance is sequentially changed, the number of steps to be changed may be optionally designed. Further, it is needless to say that substantially the same advantageous effect as described above can be obtained by sequentially changing the transmittance, without stepwise changing the transmittance.

Figure 13:
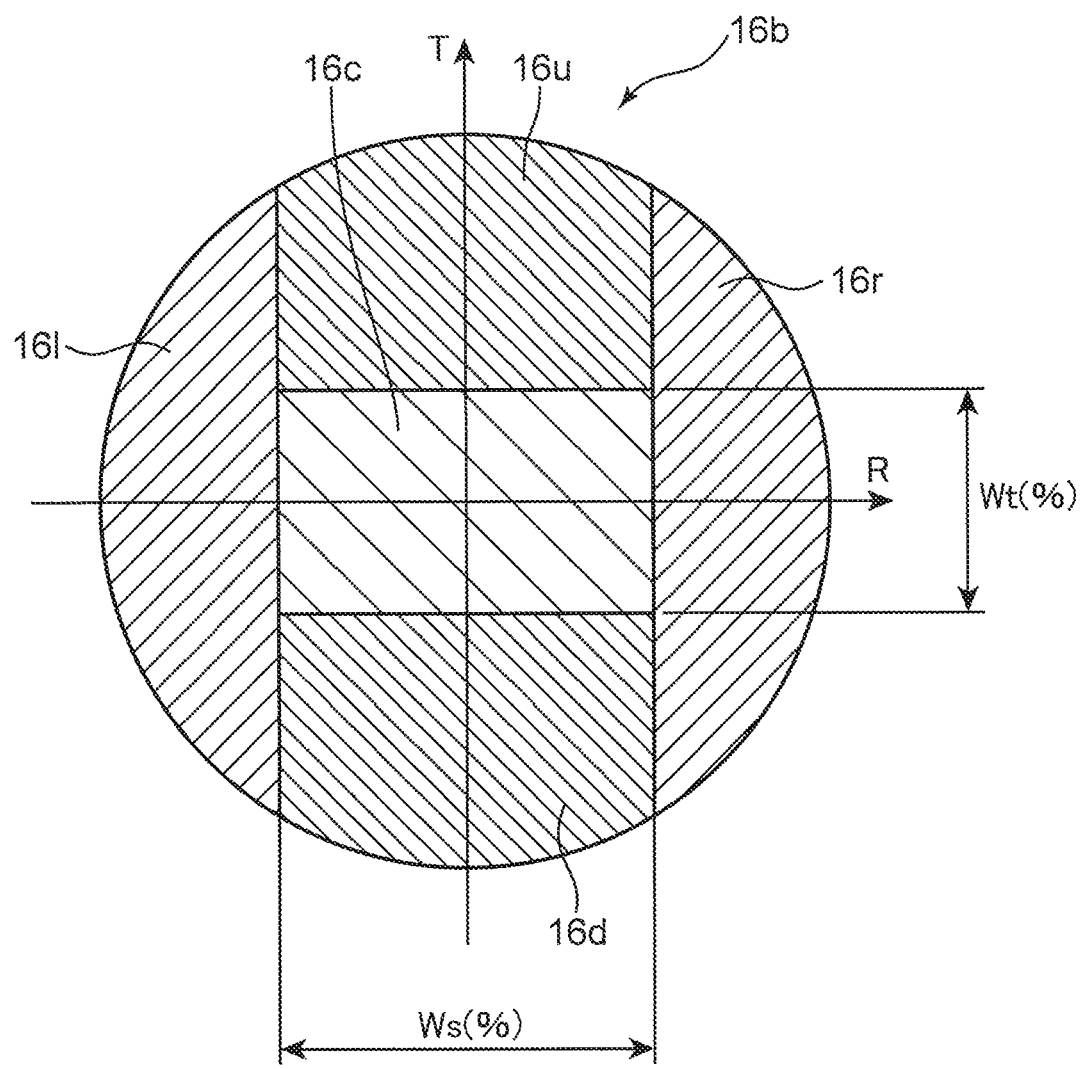
FIG. 13 is a schematic diagram illustrating a regional configuration of another transmittance limiting element for use in the optical disc information device illustrated in FIG. 1.

FIG. 13 is a schematic diagram illustrating a regional configuration of another transmittance limiting element for use in the optical disc information device illustrated in FIG. 1.

A transmittance limiting element 16b illustrated in FIG. 13 is divided into three regions along directions associated with the radial direction R of the optical disc 2, and is further divided into three regions along directions associated with the tangential direction T. Thus, the transmittance limiting element 16b is divided into five regions, in other words, a central region 16c, two radial-direction end regions 16r and 16l which interpose the central region 16c therebetween in directions associated with the radial direction R of the optical disc 2, and two tangential-direction end regions 16u and 16d which interpose the central region 16c therebetween in directions associated with the tangential direction T of the optical disc 2.

Regarding the transmittance of each of the regions, the transmittance of the tangential-direction end regions 16u and 16d is higher than the transmittance of the central region 16c. The transmittance of the central region 16c is higher than the transmittance of the radial-direction end regions 16r and 16l. For instance, the transmittance of the tangential-direction end regions 16u and 16d is 100%, the transmittance of the central region 16c is 65%, and the transmittance of the radial-direction end regions 16r and 16l is 45%.

Further, the width Ws of the central region 16c in the radial direction R is about 50% of the diameter of a light beam. The height Wt of the central region 16c in the tangential direction T is about 30% of the diameter of the light beam.

According to the aforementioned configuration, the difference in transmittance in the tangential direction T of the transmittance limiting element 16b makes it possible to reduce the spot diameter in the tangential direction T. Thus, it is possible to enhance the signal quality in the linear direction of the optical disc 2. Further, the difference in transmittance in the radial direction R makes it possible to increase the spot diameter in the radial direction R. Thus, it is possible to sufficiently reduce crosstalk from an adjacent track, and to obtain a reproduction signal of good quality.

The configuration of each of the regions is not specifically limited to the aforementioned example. It is possible to set the width, the height, and the transmittance of the central region 16c, of the radial-direction end regions 16r and 16l, and of the tangential-direction end regions 16u and 16d of the transmittance limiting element 16b to an optimum value, as necessary, depending on the condition.

Figure 14:
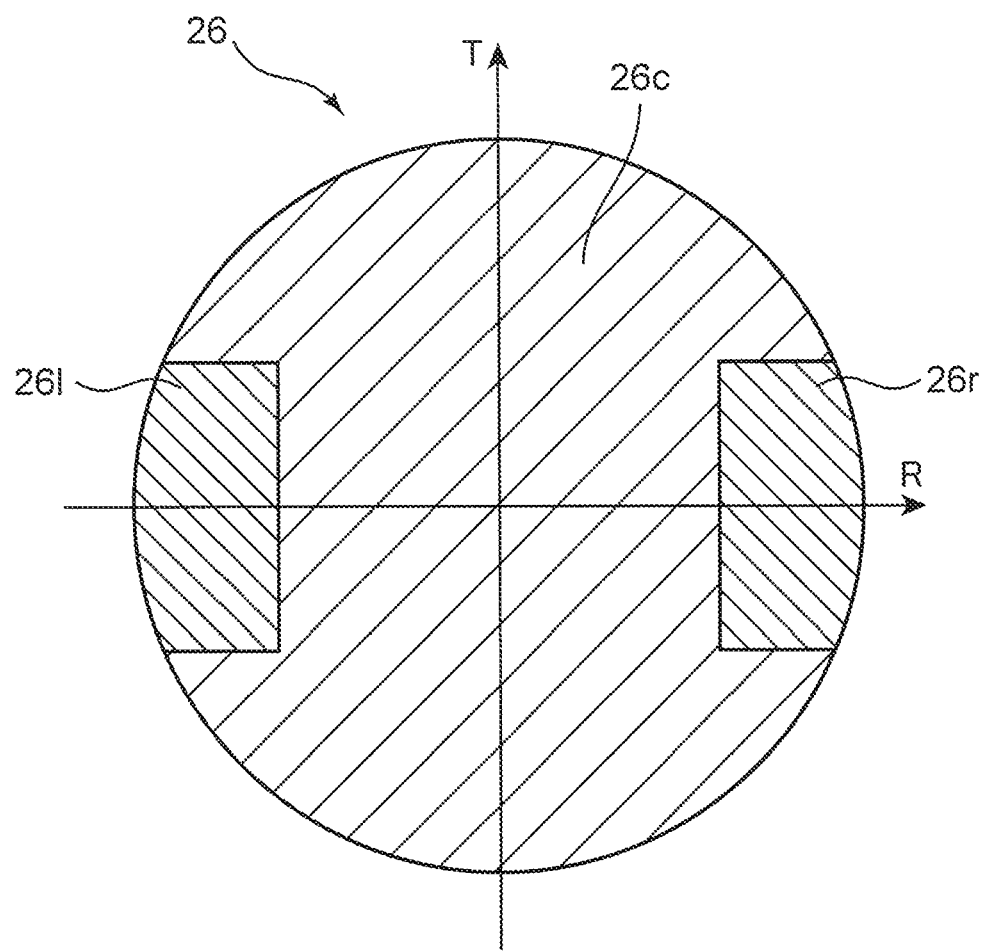
FIG. 14 is a schematic diagram illustrating a dividing configuration of another dividing element for use in the optical disc information device illustrated in FIG. 1.

Further, the dividing element usable in the embodiment is not specifically limited to the dividing element 6. For instance, it is possible to use a dividing element as described below. FIG. 14 is a schematic diagram illustrating a dividing configuration of another dividing element for use in the optical disc information device illustrated in FIG. 1.

A dividing element 26 illustrated in FIG. 14 is a diffraction element which is manufactured to function as a diffraction grating in which a fine groove is formed in a glass surface. The dividing element 26 is divided into three regions in directions associated with the radial direction R of the optical disc 2. Two end regions 26r and 26l are upper and lower regions with respect to a borderline in parallel to the radial direction R. According to this configuration, the dividing element 26 includes a central region 26c of a substantially H-shape located at the center of the dividing element 26 (a shape as viewed horizontally in the tangential direction T of the optical disc 2), and two end regions 26r and 26l, each of which has a rectangular shape (a substantially rectangular shape constituted of three straight sides and one arcuate side), and which interpose the central region 26c therebetween.

A light beam passing through each of the regions is separated in directions different from each other by the diffraction grating of each of the regions. The dividing element 26 is a three-region element. Therefore, as well as the configuration illustrated in FIG. 1, the light detector 7 is provided with three light receiving portions 7c, 7r, and 7l, and the gain controller 8 controls the three amplifiers 8c, 8r, and 8l to give the gains Kc, Kr, and Kl, respectively.

As described above, in this example, the dividing element 26 is divided into three regions by the pattern as illustrated in FIG. 14. Thus, crosstalk is mainly corrected on a portion where crosstalk from an adjacent track is severe. This makes it possible to correct crosstalk from an adjacent track more precisely. Therefore, in addition to the advantageous effects as described in the optical disc information device illustrated in FIG. 1, in an information signal to be output from the adder 9, crosstalk is advantageously reduced, and the error rate is advantageously reduced. This allows for the reproduction signal processor 10 to reproduce a reproduction signal RF with high precision.

Second Embodiment

Figure 15:
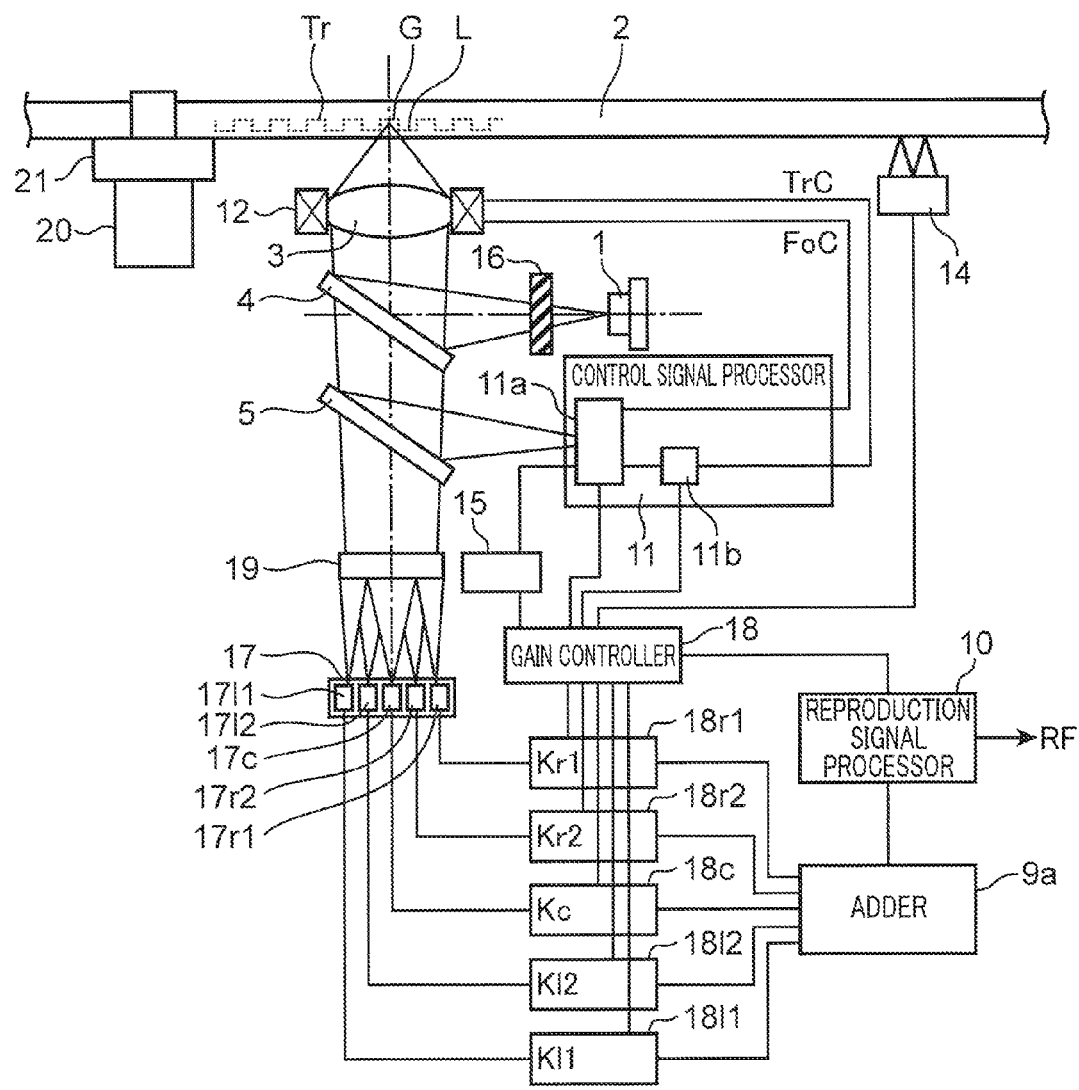
FIG. 15 is a schematic diagram illustrating a configuration of an optical disc information device in a second embodiment of the invention.
Figure 16:
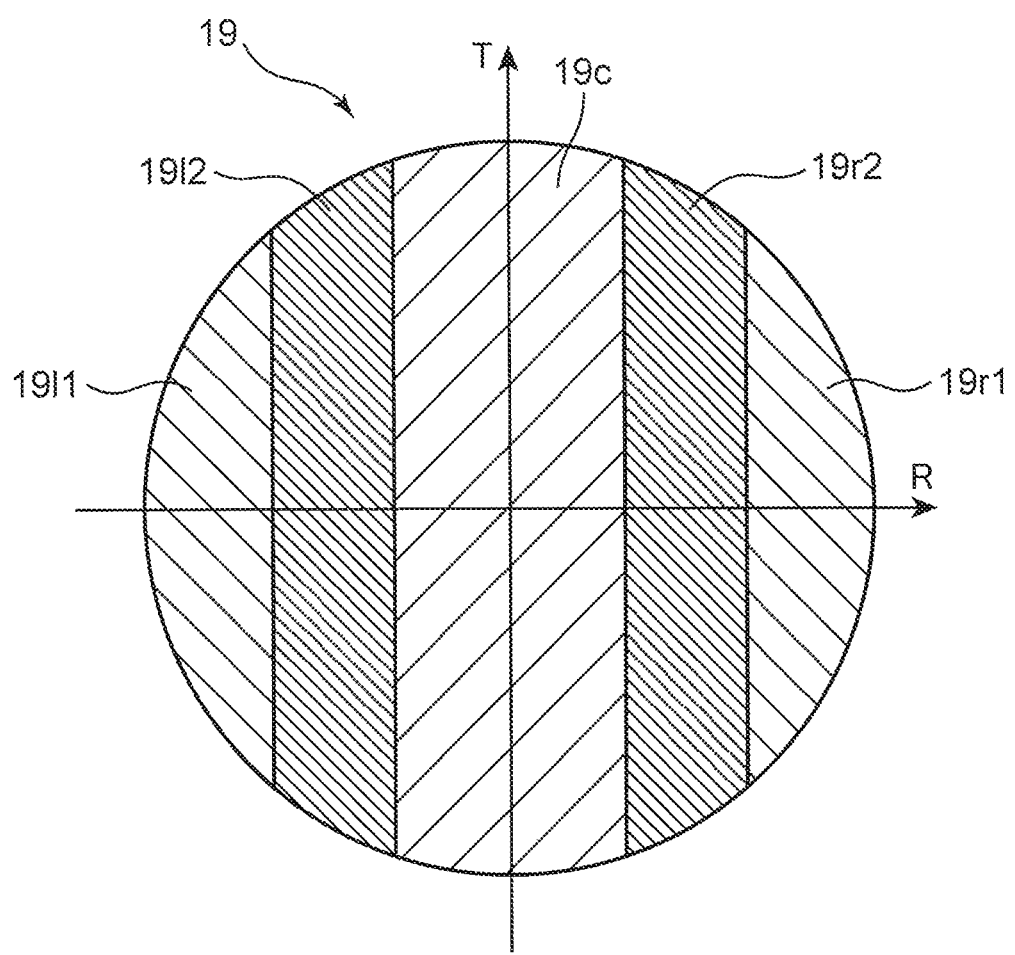
FIG. 16 is a schematic diagram illustrating a dividing configuration of a dividing element of the optical disc information device in the second embodiment of the invention.

FIG. 15 is a schematic diagram illustrating a configuration of an optical disc information device in the second embodiment of the invention. FIG. 16 is a schematic diagram illustrating a dividing configuration of the dividing element of the optical disc information device in the second embodiment.

In FIG. 15, the same constituent elements as those illustrated in FIG. 1 are indicated with the same reference signs, and description thereof is omitted herein. FIG. 15 is different from FIG. 1 in a point that a dividing element 19, a light detector 17, a gain controller 18, amplifiers 18c, 18r1, 18r2, 18l1, and 18l2, and an adder 9a are used, in place of the dividing element 6, the light detector 7, the gain controller 8, the amplifiers 8c, 8r, and 8l, and the adder 9.

The dividing element 19 is a diffraction element which is manufactured to function as a diffraction grating in which a fine groove is formed in a glass surface. As illustrated in FIG. 16, the dividing element 19 is divided into five regions in directions associated with a radial direction R of an optical disc 2. Thus, the dividing element 19 is divided into a central region 19c, two end regions 19r2 and 19l2 which interpose the central region 19c therebetween, and two end regions 19r1, and 19l1 which interpose the two end regions 19r2 and 19l2 therebetween. A light beam passing through each of the regions is separated in directions different from each other by a diffraction grating of each of the regions.

In the embodiment, when it is assumed that the diameter of a light beam is 100%, the width of each of the regions in the radial direction R of the dividing element 19 is such that: the width of the end region 19r1 is 16.7%, the width of the end region 19r2 is 16.7%, the width of the central region 19c is 33.3%, the width of the end region 19l2 is 16.7%, and the width of the end region 19l1 is 16.7%.

It is possible to set the width of each of the divided regions (the central region 19c, and the end regions 19r1, 19r2, 19l1, and 19l2) to an optimum value, as necessary, depending on the condition.

Since the dividing element 19 is constituted of five divided regions, the light detector 17 is also provided with five light receiving portions 17r1, 17r2, 17c, 17l2, and 17l1. The gain controller 18 controls five different types of amplifiers 18r1, 18r2, 18c, 18l2, and 18l1 to give gains Kr1, Kr2, Kc, Kl2, and Kl1 to the respective amplifiers. Further, the adder 9a sums up the light amount signals amplified by the optimum gains Kr1, Kr2, Kc, Kl2, and Kl1, and outputs an information signal to a reproduction signal processor 10.

As described above, in the embodiment, the dividing element 19 is a five-region element. This makes it possible to correct crosstalk from an adjacent track more precisely. Therefore, in addition to the same advantageous effects as described in the optical disc information device illustrated in FIG. 1, in an information signal to be output from the adder 9a, crosstalk is more advantageously reduced, and the error rate is more advantageously reduced. This allows for the reproduction signal processor 10 to reproduce a reproduction signal RF with high precision.

Third Embodiment

Figure 17:
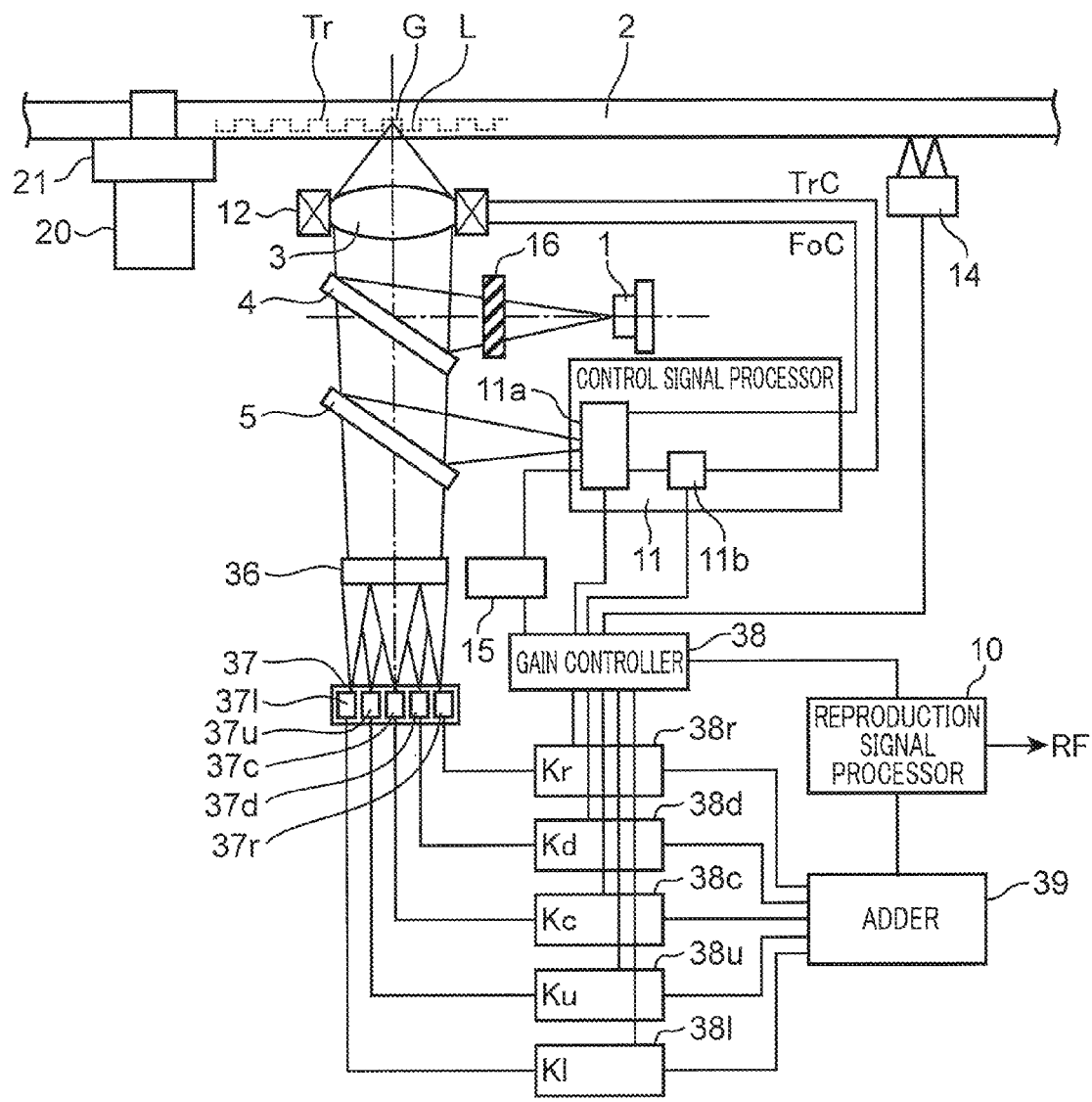
FIG. 17 is a schematic diagram illustrating a configuration of an optical disc information device in a third embodiment of the invention.
Figure 18:
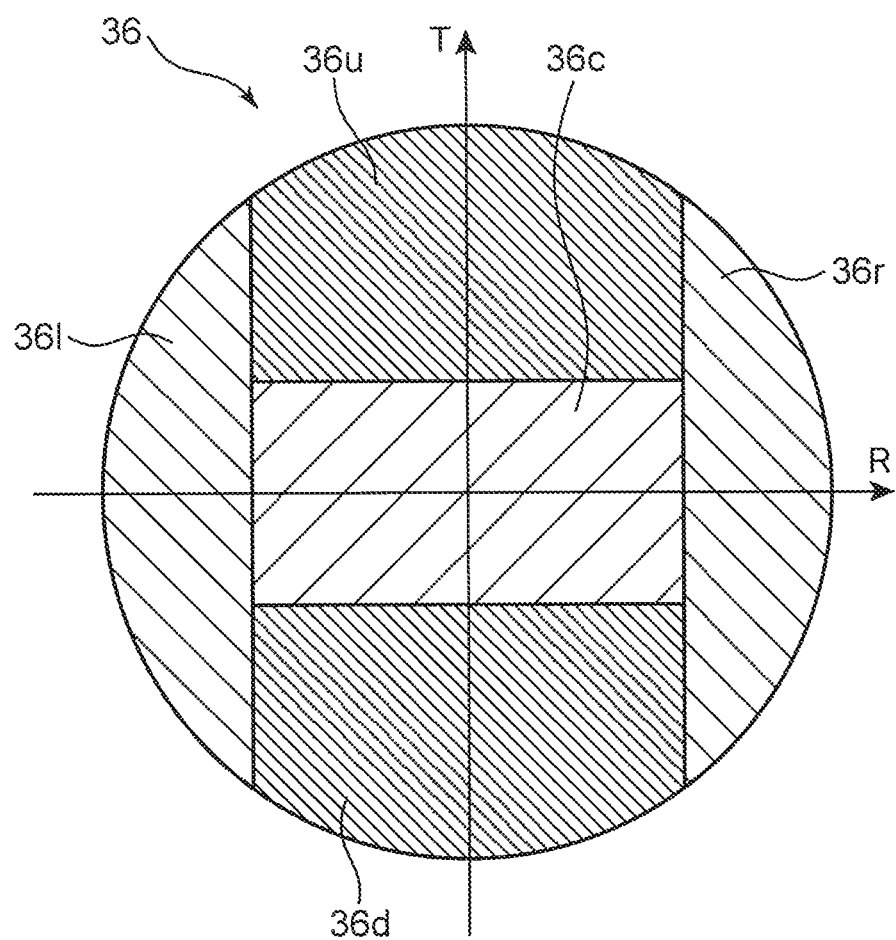
FIG. 18 is a schematic diagram illustrating a dividing configuration of a dividing element of the optical disc information device in the third embodiment of the invention.

FIG. 17 is a schematic diagram illustrating a configuration of an optical disc information device in the third embodiment of the invention. FIG. 18 is a schematic diagram illustrating a dividing configuration of a dividing element of the optical disc information device in the third embodiment of the invention. In FIG. 17, the same constituent elements as those illustrated in FIG. 1 are indicated with the same reference signs, and description thereof is omitted herein.

FIG. 17 is different from FIG. 1 in a point that a dividing element 36, a light detector 37, a gain controller 38, amplifiers 38r, 38d, 38c, 38u, and 38l, and an adder 39 are used, in place of the dividing element 6, the light detector 7, the gain controller 8, the amplifiers 8c, 8r, and 8l, and the adder 9.

The dividing element 36 is a diffraction element which is manufactured to function as a diffraction grating in which a fine groove is formed in a glass surface. As illustrated in FIG. 18, the dividing element 36 is divided into three regions in directions associated with a radial direction R of an optical disc 2. Thus, the dividing element 36 is divided into a central region (a central region 36c and two end regions 36u and 36d), and two end regions 36r and 36l which interpose the central region therebetween. Further, the central region is divided into three regions along a tangential direction T, and thus is divided into the central region 36c, and the upper and lower two end regions 36u and 36d which interpose the central region 36c therebetween. The dividing element 36 is divided into five regions and a light beam passing through each of the regions is separated in directions different from each other by a diffraction grating of each of the regions.

Specifically, the dividing element 36 is divided into three regions in directions associated with the radial direction R of the optical disc 2, and thus includes the central region, and the two end regions 36r and 36l. The central region is divided into three regions in directions associated with the tangential direction T of the optical disc, and thus includes the central region 36c, and the upper and lower two end regions 36u and 36d which vertically interpose the central region 36c therebetween.

Since the dividing element 36 is a five-region element, the light detector 37 is also provided with five light receiving portions 37r, 37d, 37c, 37u, and 37l. The gain controller 18 controls five different types of amplifiers 38r, 38d, 38c, 38u, and 38l to give gains Kr, Kd, Kc, Ku, and Kl to the respective amplifiers. Further, the adder 39 sums up light amount signals amplified by the optimum gains Kr, Kd Kc, Ku, and Kl, and outputs an information signal to a reproduction signal processor 10.

As described above, the light detector 37 includes the light receiving portion 37c which receives a light beam of the central region 36c, and the four light receiving portions 37r, 37d, 37u, and 37l which receive light beams of the four end regions 36r, 36d, 36u, and 36l. The light detector 37 outputs a light amount signal in accordance with the light amount of each of the received light beams. The amplifier 38c outputs a central amplification signal obtained by amplifying the light amount signal from the light receiving portion 37c by the gain Kc. The amplifiers 38r and 38l output end amplification signals obtained by amplifying the light amount signals from the light receiving portions 37r and 38l by the gains Kr and Kl. The amplifiers 38d and 38u output a central amplification signal obtained by amplifying the light amount signals from the light receiving portions 37d and 37u by the gains Kd and Ku.

The adder 39 sums up the amplification signals from the amplifiers 38r, 38d, 38c, 38u, and 38l, and outputs an information signal. The gain controller 38 switches between the gains Kr, Kd, Kc, Ku, and Kl of the amplifiers 38r, 38d, 38c, 38u, and 38l when the polarity of a tracking control signal TrC is inverted, and sets the gain Kc of the amplifier 38c to a value substantially smaller than at least one of the gains Kr, Kd, Ku, and Kl of the amplifiers 38r, 38d, 38u, and 38l so as to reduce crosstalk from an adjacent track of the optical disc 2.

As described above, in this embodiment, the dividing element 36 is divided into five regions by the pattern as illustrated in FIG. 18. Thus, crosstalk is mainly corrected on a portion where crosstalk from an adjacent track is severe. This makes it possible to correct crosstalk from an adjacent track more precisely.

Therefore, in addition to the advantageous effects as described in the optical disc information device illustrated in FIG. 1, in an information signal to be output from the adder 39, crosstalk is advantageously reduced, and the error rate is advantageously reduced. This allows for the reproduction signal processor 10 to reproduce a reproduction signal RF with high precision.

Fourth Embodiment

Figure 19:
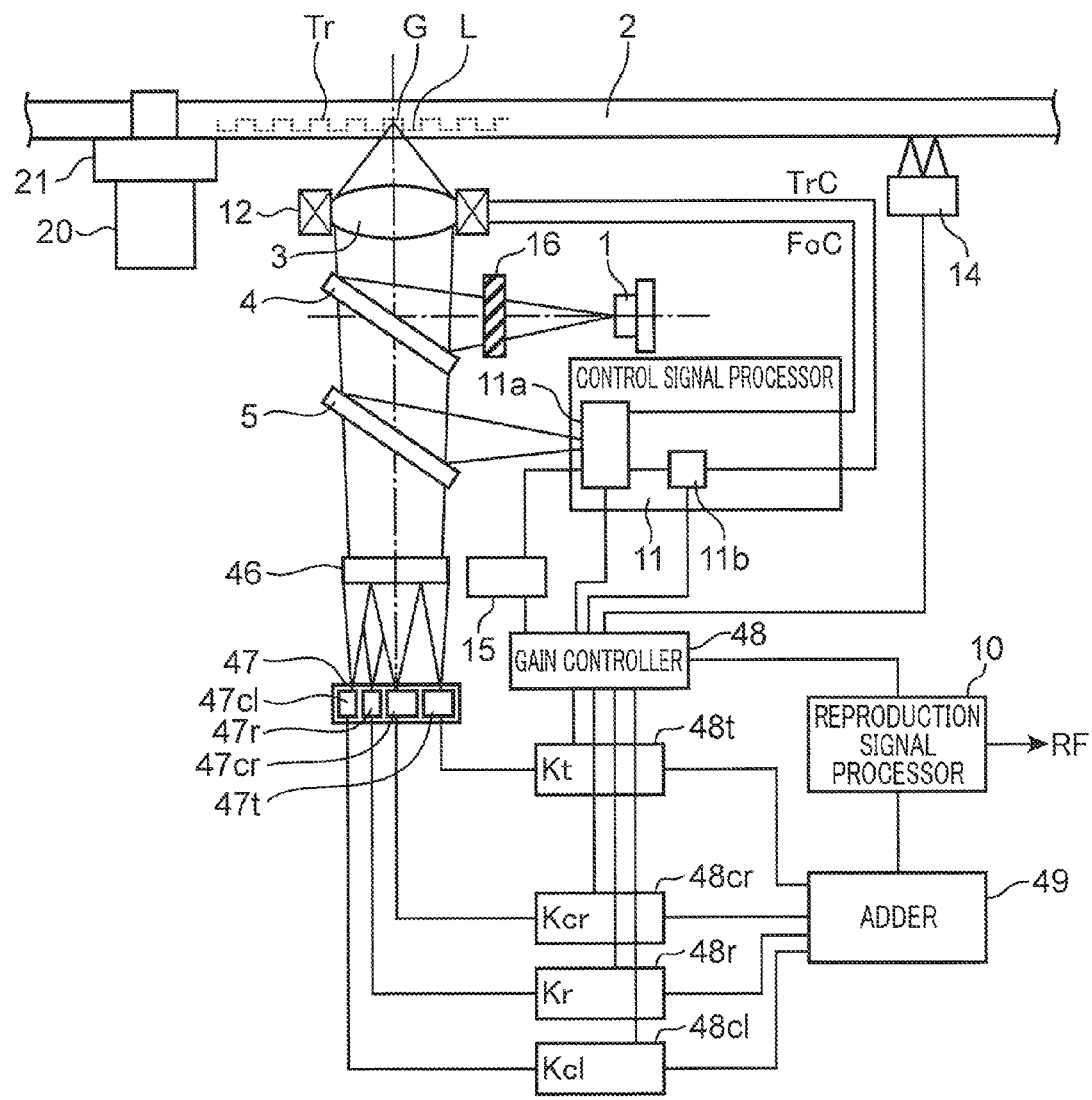
FIG. 19 is a schematic diagram illustrating a configuration of an optical disc information device in a fourth embodiment of the invention.
Figure 20:
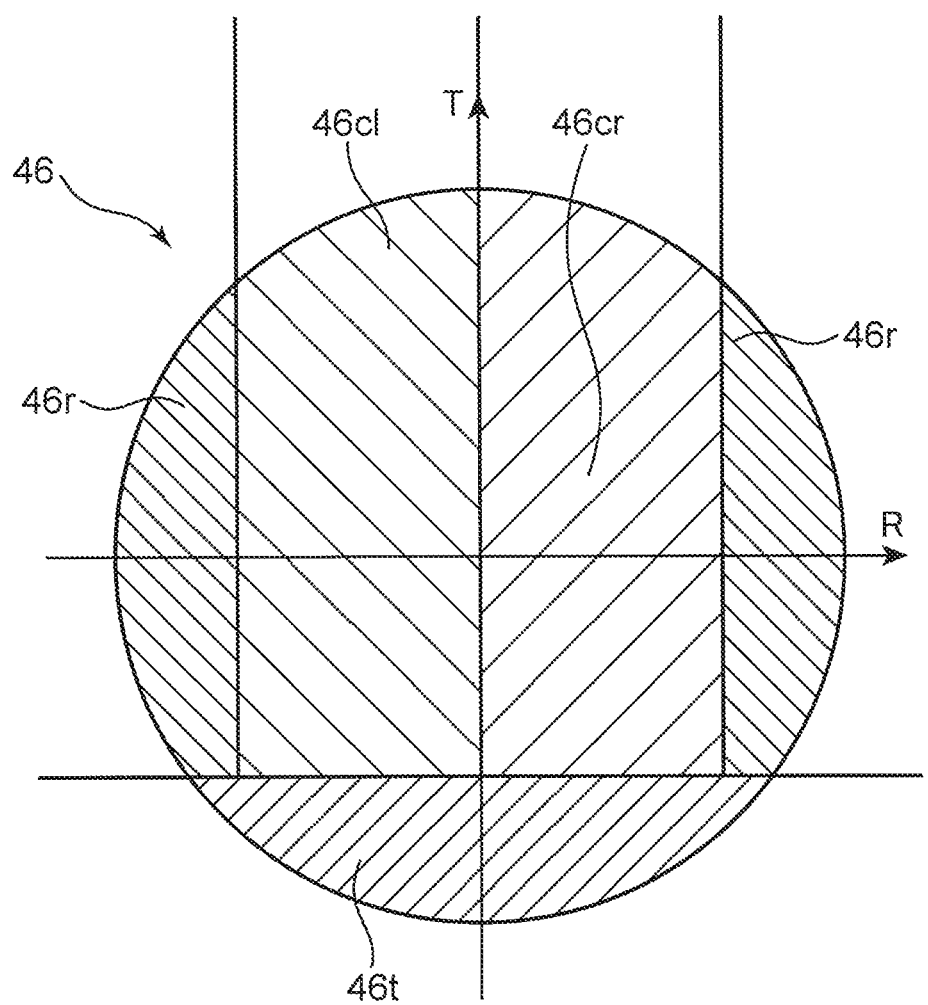
FIG. 20 is a schematic diagram illustrating a dividing configuration of a dividing element of the optical disc information device in the fourth embodiment of the invention.

FIG. 19 is a schematic diagram illustrating a configuration of an optical disc information device in the fourth embodiment of the invention. FIG. 20 is a schematic diagram illustrating a dividing configuration of a dividing element of the optical disc information device in the fourth embodiment of the invention. In FIG. 19, the same constituent elements as those illustrated in FIG. 1 are indicated with the same reference signs, and description thereof is omitted herein.

FIG. 19 is different from FIG. 1 in points that a dividing element 46, a light detector 47, a gain controller 48, amplifiers 48t, 48cr, 48r, and 48cl, and an adder 49 are used, in place of the dividing element 6, the light detector 7, the gain controller 8, the amplifiers 8c, 8r, and 8l, and the adder 9; and that the number of light amount signals to be independently output from the light detector 47 is changed in order to obtain an information signal based on the light amount signals from the light detector 47.

The dividing element 46 is a diffraction element which is manufactured to function as a diffraction grating in which a fine groove is formed in a glass surface or in a resin surface. As illustrated in FIG. 20, the dividing element 46 is divided into four regions in directions associated with a radial direction R of an optical disc 2 (directions orthogonal to the track extending direction), and a central region is divided into a divided central region 46cr and a divided central region 46cl.

Apparently, there are two regions (radial-direction end regions 46r) on both ends of the central region (the divided central regions 46cr and 46cl) while interposing the central region therebetween in the radial direction R. However, the radial-direction end regions 46r are one diffraction region designed to guide diffraction light onto one light receiving portion. Further, there is formed a tangential-direction end region 46t only on one of the two regions in a tangential direction T.

Specifically, the dividing element 46 is divided into two regions in a direction associated with the tangential direction T of the optical disc 2, and includes a divided region and the tangential-direction end region 46t. The divided region is divided into four regions in directions associated with the radial direction R of the optical disc 2. The central region of the dividing element 46 includes the two divided central regions 46cr and 46cl located at the center of the divided region. The end regions of the dividing element 46 include the two radial-direction end regions 46r which interpose the divided central regions 46cr and 46cl therebetween, and the tangential-direction end region 46t. A light beam passing through each of the regions is diffracted in directions different from each other by a diffraction grating of each of the regions.

Further, the circle illustrated in FIG. 20 indicates the effective diameter of a light beam in an idealistic state. The hatched regions of the dividing element 46 indicate only the regions inside the effective diameter of a light beam. Parting lines of the regions extend beyond the circle indicating the effective diameter of a light beam. Therefore, a light beam is diffracted regardless of a change in the effective diameter, a lens shift, and an assembling error of the device. In each of the embodiments, illustration of an extended parting line is omitted. However, as well as the configuration illustrated in FIG. 20, it is possible to extend the parting lines of the regions. The same idea is also applied to the below-mentioned embodiments.

In the embodiment, the number by which the dividing element 46 is divided is four, as the types of diffraction regions. Therefor, the light detector 47 is also formed with four light receiving portions as described above. The light detector 47 includes two divided central light receiving portions 47cr and 47cl which receive light beams passing through the two divided central regions 46cr and 46cl, as a central light receiving portion, and includes end light receiving portions 47r which receives light beams passing through the two radial-direction end regions 46r, and an end light receiving portion 47t which receives a light beam passing through the tangential-direction end region 46t, as an end light receiving portion.

The gain controller 48 also includes four types of amplifiers 48t, 48cr, 48r, and 48cl, and gives gains Kt, Kcr, Kr, and Kcl to the amplifiers 48t, 48cr, 48r, and 48cl, respectively. Further, the adder 49 sums up light amount signals amplified by the optimum gains Kt, Kcr, Kr, and Kcl, and outputs an information signal to a reproduction signal processor 10.

The dividing element 36 in the third embodiment as illustrated in FIG. 18 is also advantageous in enhancing the quality of a reproduction signal by forming a diffraction region in the tangential direction T. Further, in the dividing element 46 in the embodiment, dividing a central region along a parting line passing near the optical axis is advantageous in preventing performance degradation with respect to stress when an objective lens 3 is moved in the radial direction R (a direction orthogonal to the track groove extending direction) while following a groove-like track Tr of the optical disc 2, and in securing a margin.

Figure 21:
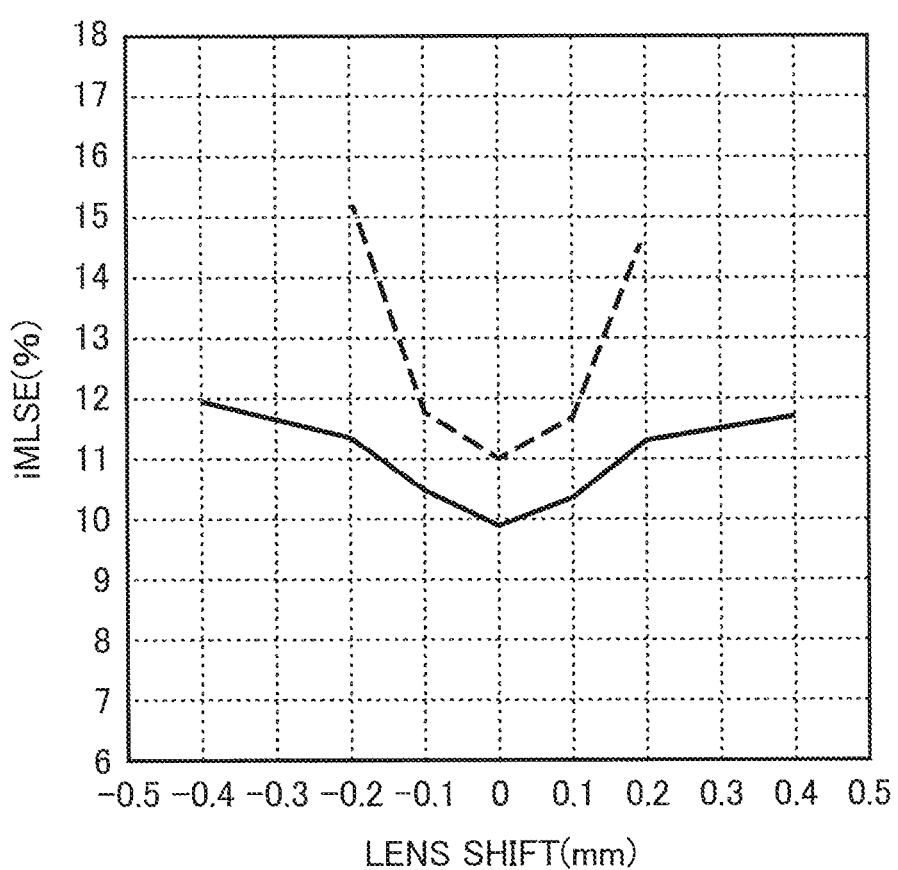
FIG. 21 is a diagram illustrating a computation result of iMLSE when lens shift has occurred in the optical disc information device in the fourth embodiment of the invention.

The aforementioned advantageous effect is described using FIG. 21. FIG. 21 is a diagram illustrating a computation result of iMLSE when lens shift has occurred in the optical disc information device in the fourth embodiment of the invention.

In FIG. 21, the vertical axis indicates a value of iMLSE (unit: %) which represents a degree of signal quality degradation, and the horizontal axis indicates a lens shift amount (unit: mm) in the radial direction R of the objective lens 3. As illustrated in FIG. 4, the broken line in FIG. 21 indicates an example of computation result of iMLSE with respect to lens shift when the dividing element is divided into three regions in the radial direction. The solid line in FIG. 21 indicates a computation result of iMLSE with respect to lens shift when the dividing element 46 illustrated in FIG. 20 is used in the embodiment.

It is clear that forming a diffraction region (the tangential-direction end region 46t) in the tangential direction T makes it possible to enhance the quality of a reproduction signal, taking into consideration that the solid line illustrates a small signal quality degradation index (a value of iMLSE), as compared with the broken line when the lens shift amount is 0 mm. Further, it is clear that the amount of increase of the signal quality degradation index (a value of iMLSE) when the lens shift is changed in the plus direction and in the minus direction is small in the solid line state, as compared with the broken line state. Thus, in the embodiment, providing a parting line both in the radial direction R and in the tangential direction T makes it possible to enhance the signal quality and to increase the margin for lens shift.

Further, unlike a case as illustrated in the example of FIG. 18, in which there are formed two regions i.e. the end region 36u and the end region 36d as the divided regions in the tangential direction T, in the embodiment, the tangential-direction end region 46t is formed only on one side of the dividing element. Further, in the example illustrated in FIG. 18, individual regions (the end regions 36r and 36l) are formed as both end divided regions in the radial direction R. In the embodiment, it is designed to guide diffraction light onto one light receiving portion (the end light receiving portions 47r), and the radial-direction end regions 46r are formed as one diffraction region. Thus, in the embodiment, the number of types of diffraction regions is reduced. This is remarkably advantageous in reducing an increase in size of a signal processing circuit such as the gain controller 48, the amplifiers 48t, 48cr, 48r, and 48cl, and the adder 49, and in enhancing the quality of a reproduction signal including increasing the margin for lens shift.

Fifth Embodiment

Figure 22:
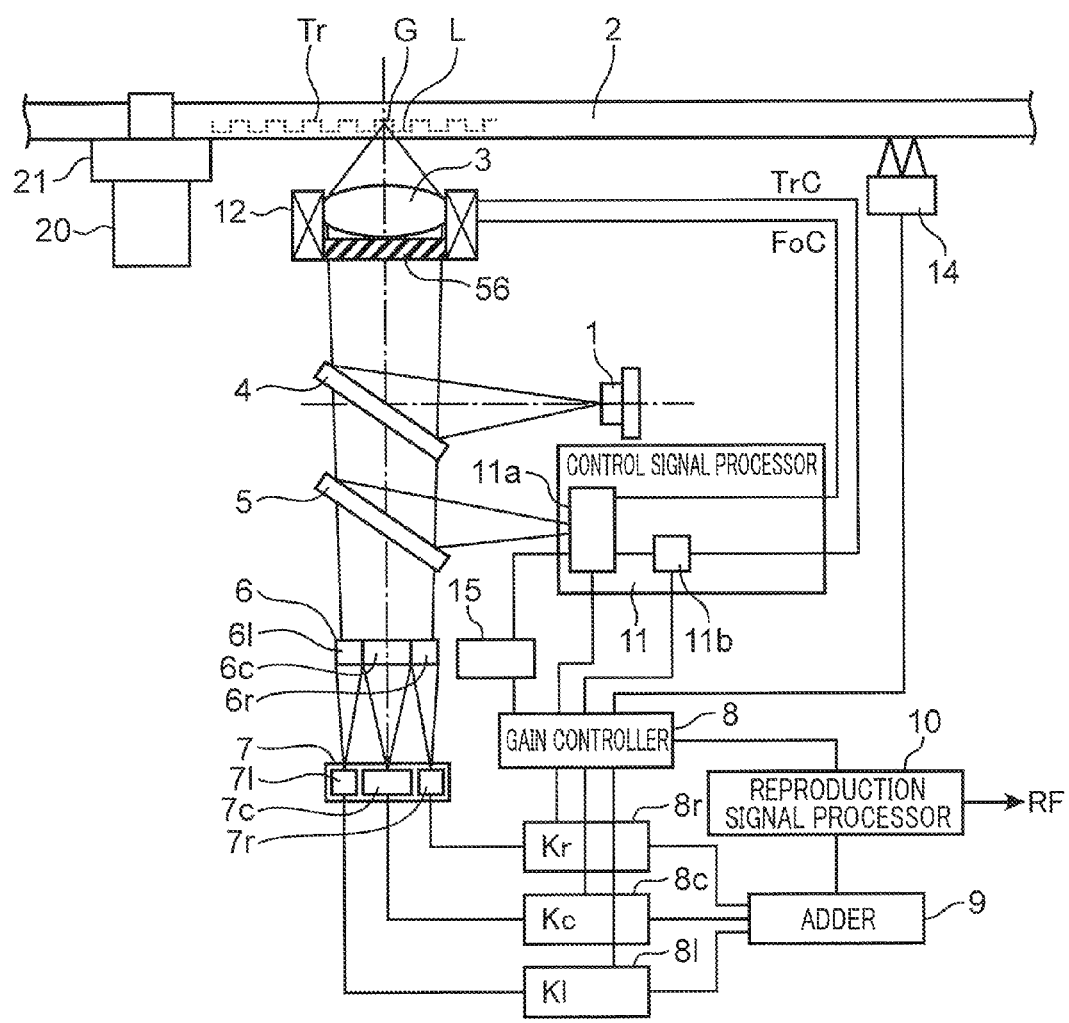
FIG. 22 is a schematic diagram illustrating a configuration of an optical disc information device in a fifth embodiment of the invention.
Figure 23:
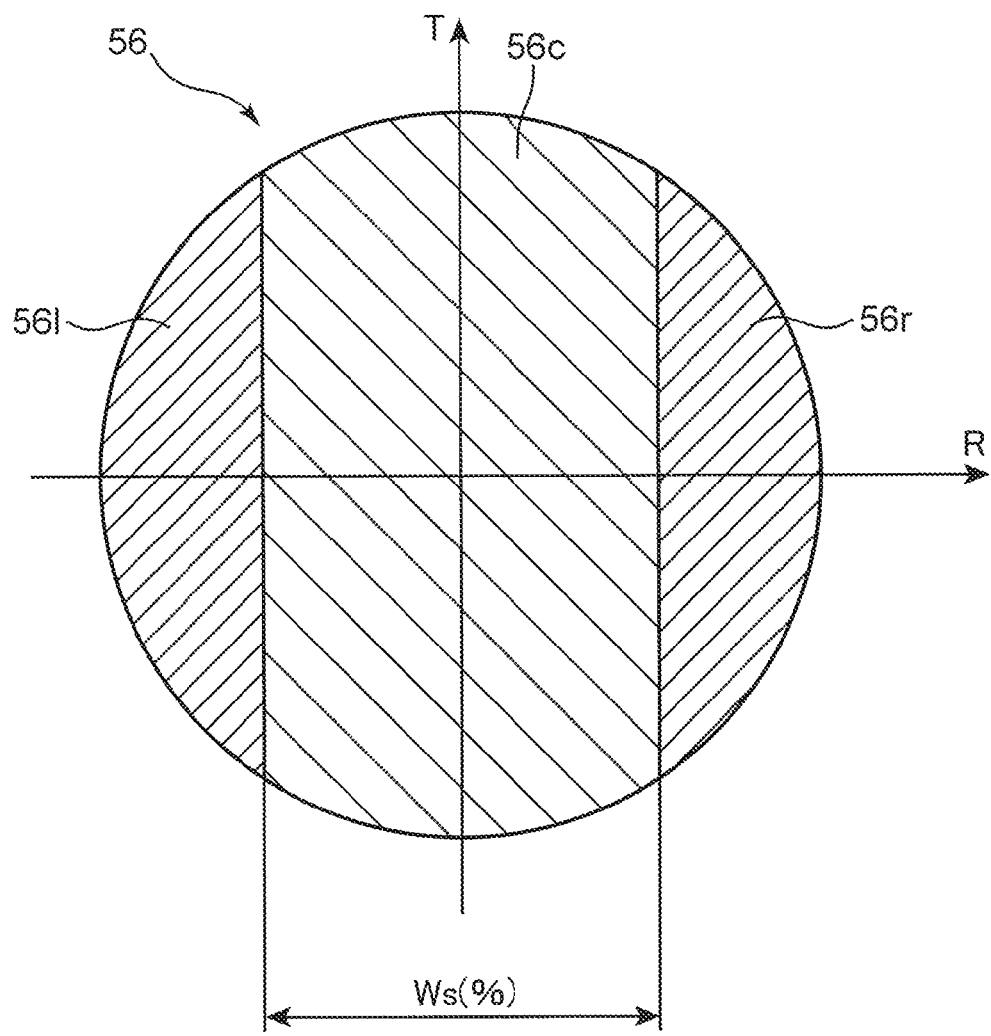
FIG. 23 is a schematic diagram illustrating a regional configuration of a transmittance limiting element of the optical disc information device in the fifth embodiment of the invention.

FIG. 22 is a schematic diagram illustrating a configuration of an optical disc information device in the fifth embodiment of the invention. FIG. 23 is a schematic diagram illustrating a transmittance configuration of a transmittance limiting element of the optical disc information device in the fifth embodiment of the invention.

In FIG. 22, the same constituent elements as those illustrated in FIG. 1 are indicated with the same reference signs, and description thereof is omitted herein. In the optical disc information device illustrated in FIG. 22, a transmittance limiting element 56 is used, in place of the transmittance limiting element 16 illustrated in FIG. 1. The transmittance limiting element 56 is integrally formed with an objective lens 3, and is loaded in an objective lens actuator 12.

As illustrated in FIG. 23, the transmittance limiting element 56 is divided into e.g. three regions along directions associated with a radial direction R of an optical disc 2 (directions orthogonal to a tangential direction T of the optical disc 2). The transmittance limiting element 56 is divided into a central region 56c, and two end regions 56r and 56l which interpose the central region 56c therebetween. In the embodiment, for instance, whereas about 100% of light passes through the central region 56c, light passing through the end regions 56r and 56l is attenuated.

The transmittance limiting element 56 is a diffraction element which is manufactured to function as a diffraction grating in which a fine groove is formed in a glass surface, or a diffraction element which is manufactured by charging liquid crystal between two glass plates. The transmittance limiting element 56 is constituted of a polarization hologram which functions as a diffraction grating with respect to only the light having a predetermined polarization direction. The transmittance limiting element 56 restricts the transmittance by the diffraction efficiency.

In the embodiment, the transmittance of the end regions 56r and 56l is set such that the transmittance is 85% with respect to light having a polarization direction of a light beam directing from a blue semiconductor laser unit 1 toward the optical disc 2, and the transmittance is 100% with respect to a light beam whose polarization direction is changed by reflection on the optical disc 2. Further, the width Ws of the central region 56c in the radial direction R is about 45% of the diameter of a light beam.

The transmittance limiting element 56 is loaded in the objective lens actuator 12, and is integrally formed with the objective lens 3. Therefore, even when the objective lens 3 is shifted, the transmittance limiting element 56 is moved together with the objective lens 3.

Figure 24:
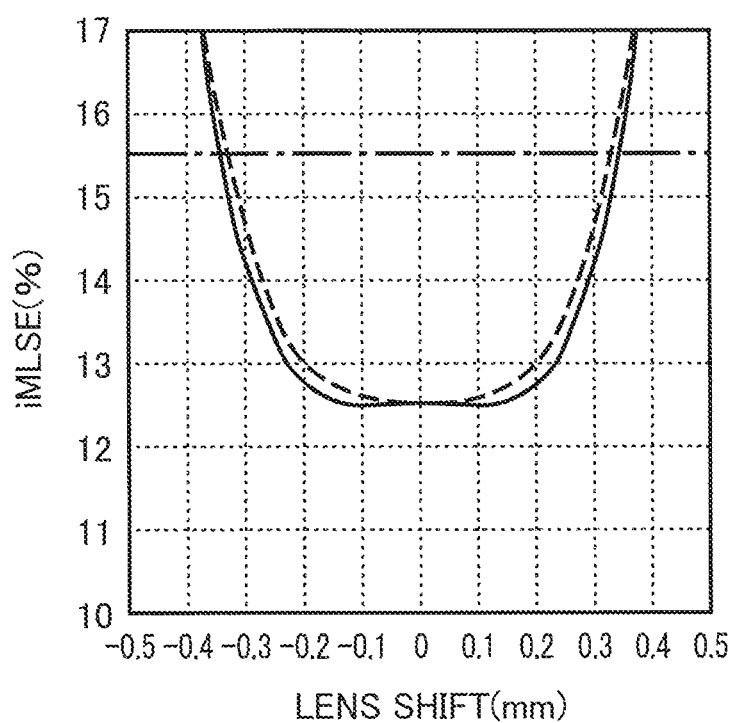
FIG. 24 is a diagram illustrating a computation result of iMLSE when lens shift has occurred in the optical disc information device in the fifth embodiment of the invention.

FIG. 24 is a diagram illustrating a computation result of iMLSE (the curve indicated by the solid line in FIG. 24) with respect to a lens shift when the width Wp of a central region 6c of a dividing element 6 is 45%, the width Ws of the central region 56c of the transmittance limiting element 56 is 45%, and the transmittance of the end regions 56r and 56l of the transmittance limiting element 56 is 85%. The curve indicated by the broken line in FIG. 24 indicates a computation result of iMLSE with respect to a lens shift when the width Wp of the central region 6c of the dividing element 6 illustrated in FIG. 9C is 45%, the width Ws of the central region 16c of the transmittance limiting element 16 is 45%, and the transmittance of the end regions 16r and 16l of the transmittance limiting element 16 is 85%. The one-dotted chain line in FIG. 24 indicates a value of reproduction limit of the optical disc 2.

As is clear from FIG. 24, integrally forming the transmittance limiting element 56 with the objective lens 3 to move the transmittance limiting element 56 together with the objective lens 3 makes it possible to increase the lens shift range that does not change the value of iMLSE, without degrading the value of iMLSE when the lens shift amount is 0 mm. Thus, the configuration of the embodiment is advantageous in reducing the assembling variation and the characteristics variation during an operation.

As described above, in the embodiment, in addition to the advantageous effects as described in the optical disc information device illustrated in FIG. 1, integrally forming the transmittance limiting element 56 with the objective lens 3 makes it possible to implement crosstalk cancellation while reducing the variation. Thus, the error rate is advantageously reduced. This allows for a reproduction signal processor 10 to reproduce a reproduction signal RF with high precision.

Sixth Embodiment

Figure 25:
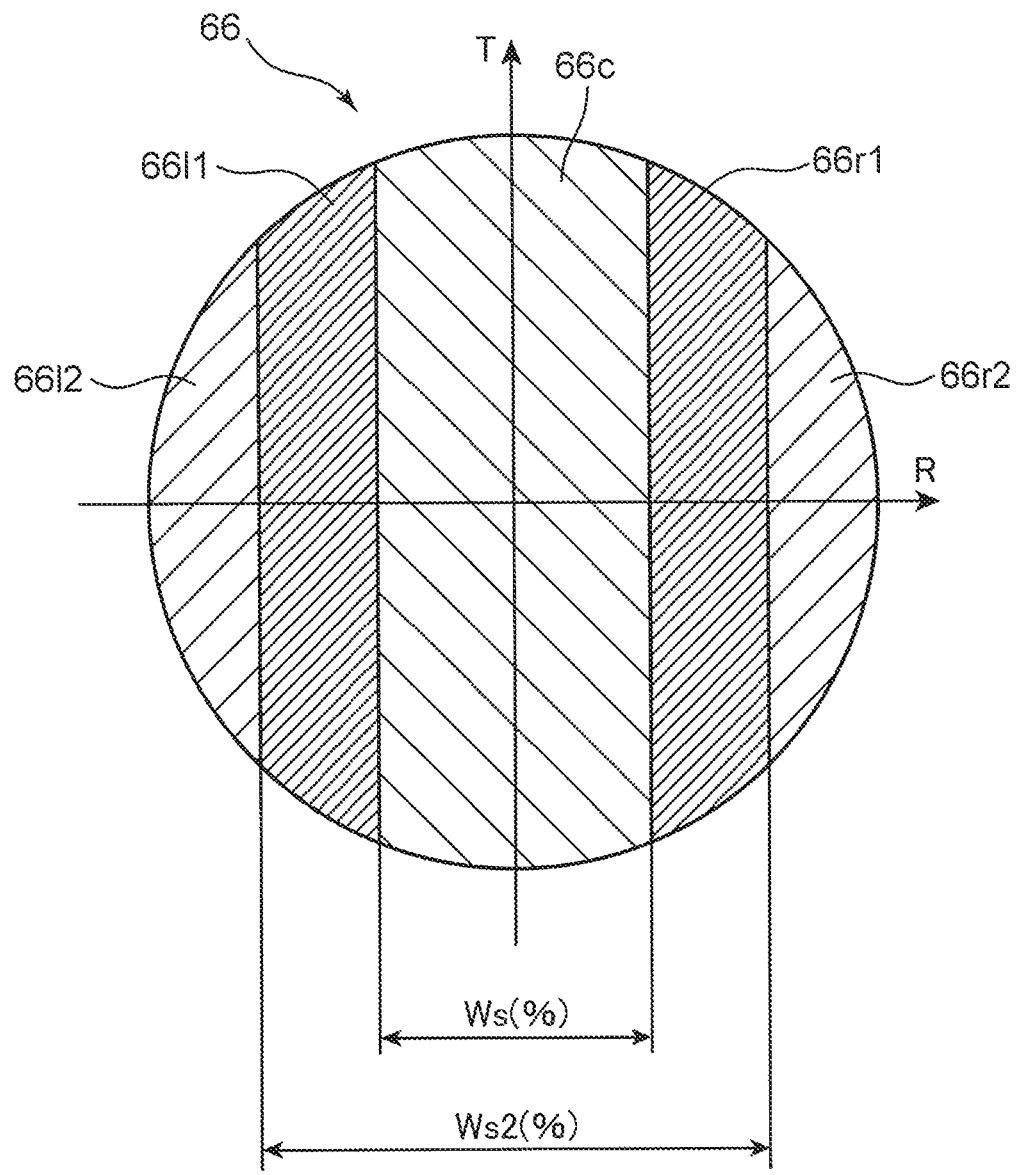
FIG. 25 is a schematic diagram illustrating a regional configuration of a transmittance limiting element of an optical disc information device in a sixth embodiment of the invention.

FIG. 25 is a schematic diagram illustrating a transmittance configuration of a transmittance limiting element of an optical disc information device in the sixth embodiment of the invention. In the optical disc information device in the embodiment, a transmittance limiting element 66 is used, in place of the transmittance limiting element 16 illustrated in FIG. 1. The configuration other than the above is substantially the same as the optical disc information device illustrated in FIG. 1, and therefore, illustration and detailed description thereof is omitted herein.

As illustrated in FIG. 25, the transmittance limiting element 66 is divided into e.g. five regions along directions associated with a radial direction R of an optical disc 2 (directions orthogonal to a tangential direction T of the optical disc 2). Thus, the transmittance limiting element 66 is divided into a central region 66c, two end regions 66r1 and 66l1 which interpose the central region 66c therebetween, and two end regions 66r2 and 66/2 which are disposed on the outer side of the two end regions 66r1 and 66/1. The transmittance limiting element 66 is disposed on an optical path from a blue semiconductor laser unit 1 to an objective lens 3.

In the embodiment, for instance, whereas about 100% of light passes through the central region 66c, light passing through the end regions 66r1, 66/1, 66r2, and 66/2 is attenuated.

The transmittance limiting element 66 is a diffraction element which is manufactured to function as a diffraction grating in which a fine groove is formed in a glass surface, or a diffraction element which is manufactured by charging liquid crystal between two glass plates. The transmittance limiting element 66 is constituted of a polarization hologram which functions as a diffraction grating with respect to only the light having a predetermined polarization direction. The transmittance limiting element 66 restricts the transmittance by the diffraction efficiency.

In the embodiment, for instance, the transmittance of the end regions 66r1 and 66/1 is about 80%, and the transmittance of the end regions 66r2 and 66/2 is about 90%. The width Ws of the central region 66c in the radial direction R is about 40% of the diameter of a light beam, and the width Ws2 of both ends of the end regions 66r1 and 66/1 which interpose the central region 66c therebetween is about 70% of the diameter of the light beam.

Further, preferably, the transmittance of the end regions 66r1 and 66/1, and of the end regions 66r2 and 66/2 of the transmittance limiting element 66 may be 50% or more. In this case, it is possible to minimize the value of iMLSE, and to obtain a reproduction signal of better quality. Thus, the aforementioned configuration is advantageous in implementing high-quality recording and reproduction.

In the embodiment, constituting the transmittance limiting element 66 of five regions having the pattern as illustrated in FIG. 25 with use of the transmittance limiting element 66 in place of using the transmittance limiting element 16, makes it possible to correct crosstalk from an adjacent track more precisely.

Thus, in addition to the advantageous effects as described in the optical disc information device illustrated in FIG. 1, in an information signal to be output from an adder 9, crosstalk is advantageously reduced, and the error rate is advantageously reduced. This allows for a reproduction signal processor 10 to reproduce a reproduction signal RF with high precision.

The configuration of each of the regions is not specifically limited to the aforementioned example. It is possible to set the width Wp of the central region 6c of the dividing element 6, the width Ws of the central region 66c of the transmittance limiting element 66, the width Ws2 of both ends of the end regions 66r1 and 66/1 which interpose the central region 66c therebetween, the transmittance of the end regions 66r1 and 66/1 of the transmittance limiting element 66, and the transmittance of the end regions 66r2 and 66/2 of the transmittance limiting element 66 to an optimum value, as necessary, depending on the condition.

Seventh Embodiment

Figure 26:
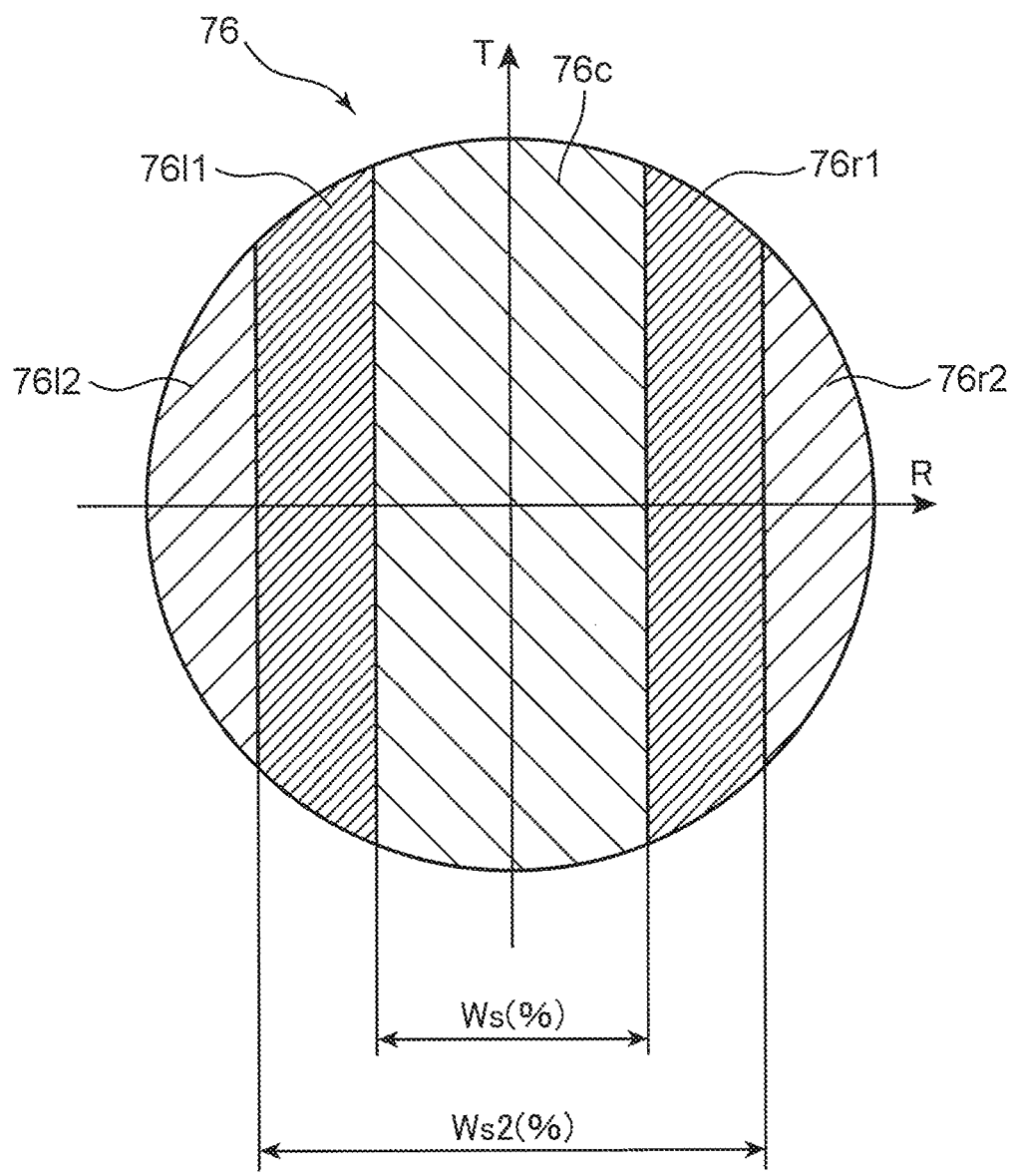
FIG. 26 is a schematic diagram illustrating a regional configuration of a transmittance limiting element of an optical disc information device in a seventh embodiment of the invention.

FIG. 26 is a schematic diagram illustrating a transmittance configuration of a transmittance limiting element of an optical disc information device in the seventh embodiment of the invention. In the optical disc information device in the embodiment, a transmittance limiting element 76 is used, in place of the transmittance limiting element 56 illustrated in FIG. 22. The configuration other than the above is substantially the same as the optical disc information device illustrated in FIG. 22, and therefore, illustration and detailed description thereof is omitted herein.

As illustrated in FIG. 26, the transmittance limiting element 76 is divided into e.g. five regions along directions associated with a radial direction R of an optical disc 2 (directions orthogonal to a tangential direction T of the optical disc 2). Thus, the transmittance limiting element 76 is divided into a central region 76c, two end regions 76r1 and 76/1 which interpose the central region 76c therebetween, and two end regions 76r2 and 76/2 which are disposed on the outer side of the two end regions 76r1 and 76/1. The transmittance limiting element 76 is integrally formed with an objective lens 3.

In the embodiment, for instance, whereas about 100% of light passes through the central region 76c, light passing through the end regions 76r1, 76/1, 76r2, and 76/2 is attenuated.

The transmittance limiting element 76 is a diffraction element which is manufactured to function as a diffraction grating in which a fine groove is formed in a glass surface, or a diffraction element which is manufactured by charging liquid crystal between two glass plates. The transmittance limiting element 76 is constituted of a polarization hologram which functions as a diffraction grating with respect to only the light having a predetermined polarization direction. The transmittance limiting element 76 restricts the transmittance by the diffraction efficiency.

In the embodiment, for instance, the transmittance of the end regions 76r1 and 76/1 is about 80%, and the transmittance of the end regions 76r2 and 76/2 is about 90% with respect to light having a polarization direction of a light beam directing from a blue semiconductor laser unit 1 toward the optical disc 2. The transmittance of the end regions 76r1, 76/1, 76r2, and 76/2 is about 100% with respect to a light beam whose polarization direction is changed by reflection on the optical disc 2. Further, the width Ws of the central region 76c in the radial direction R is about 40% of the diameter of a light beam, and the width Ws2 of both ends of the end regions 76r1 and 76/1 which interpose the central region 76c therebetween is about 70% of the diameter of the light beam.

Further, preferably, the transmittance of the end regions 76r1 and 76/1, and of the end regions 76r2 and 76/2 of the transmittance limiting element 76 may be 50% or more. In this case, it is possible to minimize the value of iMLSE, and to obtain a reproduction signal of better quality. Thus, the aforementioned configuration is advantageous in implementing high-quality recording and reproduction.

In the embodiment, constituting the transmittance limiting element 76 of five regions having the pattern as illustrated in FIG. 26 with use of the transmittance limiting element 76, in place of using the transmittance limiting element 56, makes it possible to correct crosstalk from an adjacent track more precisely.

Therefore, in addition to the same advantageous effects as described in the optical disc information device illustrated in FIG. 22, in an information signal to be output from an adder 9, crosstalk is more advantageously reduced, and the error rate is more advantageously reduced. This allows for a reproduction signal processor 10 to reproduce a reproduction signal RF with high precision.

The configuration of each of the regions is not specifically limited to the aforementioned example. It is possible to set the width Wp of the central region 6c of the dividing element 6, the width Ws of the central region 76c of the transmittance limiting element 76, the width Ws2 of both ends of the end regions 76r1 and 76l1 which interpose the central region 76c therebetween, the transmittance of the end regions 76r1 and 76l1 of the transmittance limiting element 76, and the transmittance of the end regions 76r2 and 76l2 to an optimum value, as necessary, depending on the condition.

Eighth Embodiment

Figure 27:
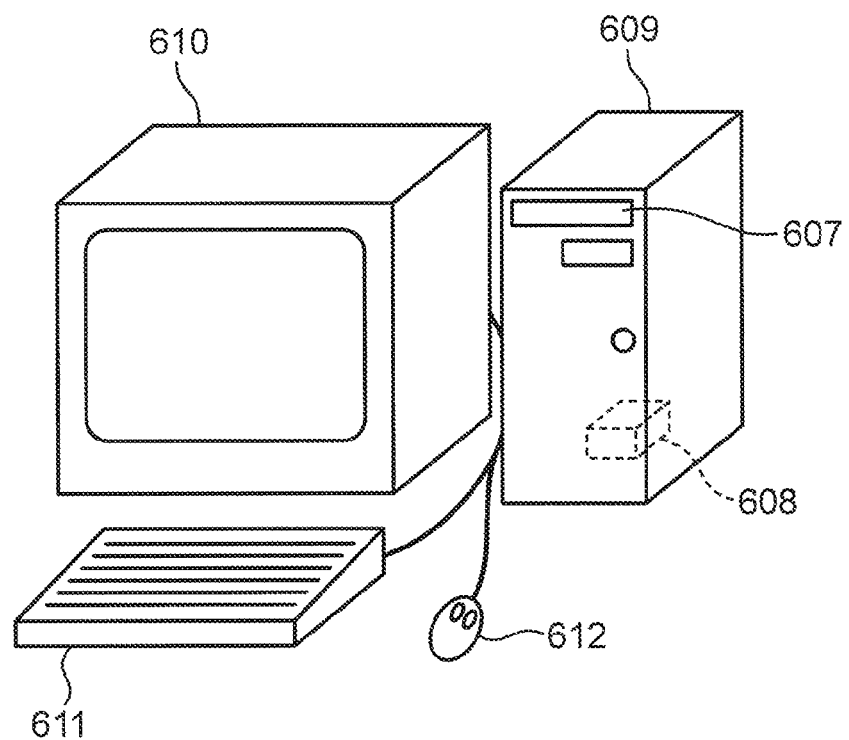
FIG. 27 is a perspective view of a computer in an eighth embodiment of the invention.

The embodiment is an embodiment of a computer device, as an example of an information processing device incorporated with the optical disc information device of any one of the aforementioned embodiments. FIG. 27 is a perspective view of a computer in the embodiment.

A computer 609 illustrated in FIG. 27 is provided with an optical disc information device 607 of any one of the aforementioned embodiments, an input device such as a keyboard 611 and a mouse 612 for allowing a user to input information, an arithmetic device 608 such as a CPU (Central Processing Unit) for performing computation based on the information input from the input device or based on information read from the optical disc information device 607, and an output device 610 such as a cathode ray tube or a liquid crystal display device for displaying information on a result computed by the arithmetic device 608. The arithmetic device 608 functions as an information processor which processes information to be recorded in the optical disc information device 607 and/or information reproduced from the optical disc information device 607.

The computer 609 in the embodiment is incorporated with the optical disc information device 607 of any one of the aforementioned embodiments. The computer 609 is advantageous in reducing crosstalk by a system configured to obtain an actual tracking error signal, and in increasing the recording density in the track direction. Thus, the embodiment is advantageous in performing stable high-density recording and reproduction, and in reducing the cost.

Further, the computer 609 may be loaded with a wired or wireless input/output terminal configured to input information to be recorded in the optical disc information device 607 and to output information read by the optical disc information device 607 to the outside. This makes it possible to communicate information with a variety of devices such as a computer, a telephone, and a TV tuner via a network, and to utilize the computer as a common information server (an optical disc server) with respect to these devices. In this case, it is possible to stably record or reproduce with respect to optical discs of different types. Thus, the computer can be widely used in a variety of fields.

Furthermore, providing a changer configured to insert and eject a plurality of optical discs with respect to the optical disc information device 607 is advantageous in recording and accumulating a large amount of information.

Ninth Embodiment

Figure 28:
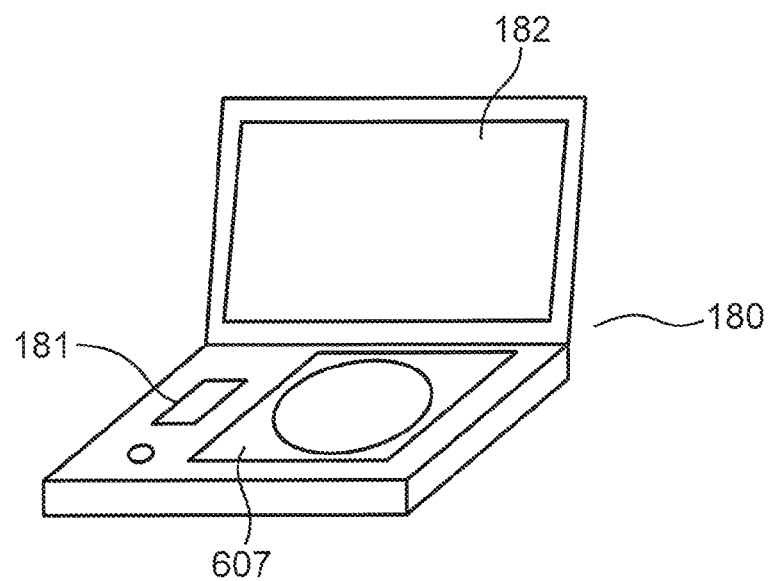
FIG. 28 is a perspective view of an optical disc player in a ninth embodiment of the invention.

The embodiment is an embodiment of an optical disc player, as an example of an information processing device incorporated with the optical disc information device of any one of the aforementioned embodiments. FIG. 28 is a perspective view of the optical disc player in the embodiment.

An optical disc player 180 illustrated in FIG. 28 is provided with the optical disc information device 607 of any one of the aforementioned embodiments, and a conversion device e.g. a decoder 181 for converting information into an image, specifically, converting an information signal to be obtained from the optical disc information device 607 into an image. The decoder 181 functions as an information processor which processes information to be recorded in the optical disc information device 607 and/or information reproduced from the optical disc information device 607. Further, the aforementioned configuration is usable as a car navigation system. Further, the optical disc player may be provided with a display device 182 such as a liquid crystal display monitor.

The optical disc player 180 in the embodiment is incorporated with the optical disc information device 607 of any one of the aforementioned embodiments. The optical disc player 180 is advantageous in reducing crosstalk by a system configured to obtain an actual tracking error signal, and in increasing the recording density in the track direction. Thus, the embodiment is advantageous in performing stable high-density recording and reproduction, and in reducing the cost for wide use of the device.

Tenth Embodiment

Figure 29:
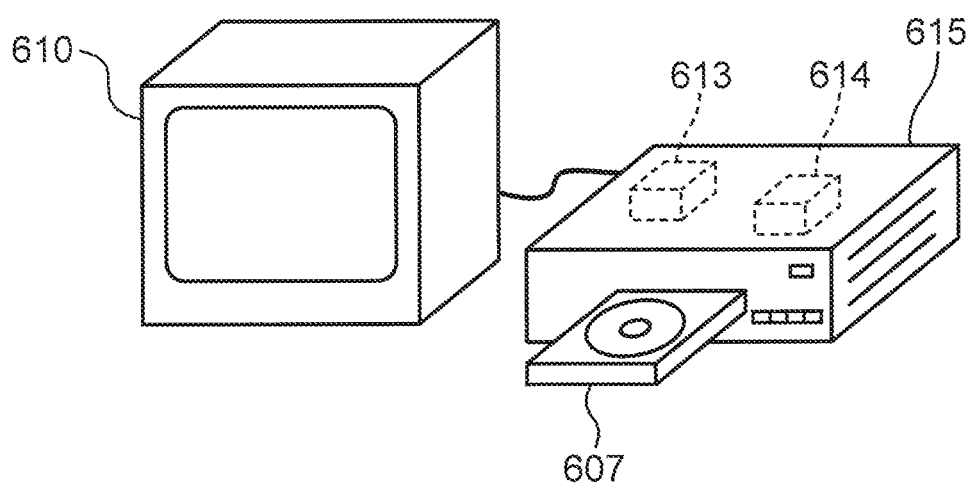
FIG. 29 is a perspective view of an optical disc recorder in a tenth embodiment of the invention.

The embodiment is an embodiment of an optical disc recorder, as an example of an information processing device incorporated with the optical disc information device of any one of the aforementioned embodiments. FIG. 29 is a perspective view of the optical disc recorder in the embodiment.

An optical disc recorder 615 illustrated in FIG. 29 is provided with the optical disc information device 607 of any one of the aforementioned embodiments, and a recording signal processing circuit 613 for converting an image signal into an information signal to be recorded in an optical disc by the optical disc information device 607.

The optical disc recorder 615 may desirably include a reproduction signal processing circuit 614 for converting an information signal to be obtained from the optical disc information device 607 into an image signal. According to this configuration, it is possible to reproduce a portion that has already been recorded. Further, the optical disc recorder 615 may be provided with an output device 610 such as a cathode ray tube or a liquid crystal display device for displaying information.

In the embodiment, the recording signal processing circuit 613 and/or the reproduction signal processing circuit 614 function as an information processor which processes information to be recorded in the optical disc information device 607 and/or information reproduced from the optical disc information device 607.

The optical disc recorder 615 in the embodiment is incorporated with the optical disc information device 607 of any one of the aforementioned embodiments. The optical disc recorder 615 is advantageous in reducing crosstalk by a system configured to obtain an actual tracking error signal, and in increasing the recording density in the track direction. Thus, the embodiment is advantageous in performing stable high-density recording and reproduction, and in reducing the cost for wide use of the device.

The elements in the embodiments may be optionally combined with each other. The combinations are advantageous in providing the aforementioned advantageous effects.

The following is the description about the aforementioned embodiments in each aspect.

Specifically, an optical disc information device according to an aspect of the invention is an optical disc information device for reproducing and/or recording information with respect to an optical disc having a track in the form of a groove, and capable of recording information in a land portion and in a groove portion of the groove. The optical disc information device is provided with a laser light source which emits a light flux of a wavelength λ; an objective lens having a numerical aperture NA and configured to collect the light flux emitted from the laser light source and to form a light collecting spot on the optical disc; a transmittance limiting element including a first central region, and at least two first end regions which interpose the first central region therebetween, and configured to attenuate light passing through at least the first end regions out of the light flux emitted from the laser light source more strongly than light passing through the first central region; a dividing element including a second central region, and at least two second end regions which interpose the second central region therebetween, and configured to divide reflected light that is reflected and diffracted on the optical disc into a light flux of the second central region and light fluxes of the second end regions; a light detector including a central light receiving portion which receives the light flux of the second central region, and at least two end light receiving portions which receive the light fluxes of the second end regions, and configured to output a light amount signal in accordance with a light amount of each of the received light fluxes; a central amplifier which receives the light amount signal from the central light receiving portion and outputs a central amplification signal amplified by a predetermined gain; at least two end amplifiers which receive the light amount signals from the end light receiving portions and output end amplification signals amplified by a predetermined gain; a gain controller which controls the gain of the central amplifier and the gains of the end amplifiers; an adder which sums up the central amplification signal from the central amplifier and the end amplification signals from the end amplifiers, and outputs an information signal; a reproduction signal processor which processes the information signal and outputs a reproduction signal; and a control signal processor which receives reflected light that is reflected and diffracted on the optical disc, and generates a focusing control signal and a tracking control signal.

In the optical disc information device having the aforementioned configuration, the transmittance limiting element includes the first central region, and the two first end regions which interpose the first central region therebetween, and attenuates the light passing through the first end regions out of the light flux emitted from the laser light source more strongly than the light passing through the first central region. Therefore, the difference in transmittance of the transmittance limiting element makes it possible to increase the spot diameter of light to be incident on the dividing element in the direction of the second end regions. This makes it possible to increase a crosstalk component from an adjacent track, which may be received on the end light receiving portions of the light detector. Thus, in a high-density optical disc in which the recording density in the track direction is increased, it is possible to sufficiently reduce crosstalk which may leak from an adjacent track, and to obtain a reproduction signal of good quality.

According to the aforementioned configuration, it is possible to perform stable tracking control with respect to a high-density optical disc in which the track pitch is reduced to a value equal to or smaller than the diffraction limit of a light beam. Further, it is possible to reduce leakage of a signal from an adjacent track, and to reduce the error rate. Thus, the aforementioned configuration is advantageous in implementing recording and reproduction of an information signal with high precision.

Thus, it is possible to implement an optical disc information device capable of reducing crosstalk by a system configured to obtain an actual tracking error signal, and capable of increasing the recording intensity in the track direction.

Preferably, the transmittance limiting element may be divided into three regions in directions associated with a radial direction of the optical disc, and may include the first central region and the two first end regions. The dividing element may be divided into three regions in directions associated with the radial direction of the optical disc, and may include the second central region and the two second end regions.

In the aforementioned configuration, it is possible to increase the spot diameter in the radial direction of the optical disc, and to increase a crosstalk component from an adjacent track, which may be received on the end light receiving portions of the light detector. This is advantageous in sufficiently reducing crosstalk which may leak from an adjacent track.

Preferably, the transmittance of the first end regions of the transmittance limiting element may be 50% or more.

In the aforementioned configuration, it is possible to minimize the value of iMLSE, and to obtain a reproduction signal of better quality. This is advantageous in implementing high quality recording and reproduction.

The transmittance limiting element may be divided into five regions in directions associated with a radial direction of the optical disc. The first end regions may include two third end regions which interpose the first central region therebetween, and two fourth end regions which interpose the third end regions therebetween. The dividing element may be divided into three regions in directions associated with the radial direction of the optical disc, and may include the second central region and the two second end regions.

In the aforementioned configuration, constituting the transmittance limiting element of five regions having the aforementioned pattern with use of the five-region transmittance limiting element, in place of using the three-region transmittance limiting element, makes it possible to correct crosstalk from an adjacent track more precisely.

According to the aforementioned configuration, in an information signal to be output from the adder, crosstalk is more advantageously reduced, and the error rate is more advantageously reduced. This allows for the reproduction signal processor to reproduce a reproduction signal with high precision.

Preferably, the transmittance of the third end regions and of the fourth end regions of the transmittance limiting element may be 50% or more.

In the aforementioned configuration, it is possible to minimize the value of iMLSE, and to obtain a reproduction signal of better quality. This is advantageous in implementing high quality recording and reproduction.

Preferably, the transmittance limiting element may be disposed on an optical path between the laser light source and the objective lens.

In the aforementioned configuration, the difference in transmittance of the transmittance limiting element on the optical path from the laser light source to the objective lens makes it possible to increase the spot diameter in the radial direction. This makes it possible to increase a crosstalk component from an adjacent track, which may be received on the end light receiving portions of the light detector.

Preferably, the transmittance limiting element may be integrally formed with the objective lens.

In the aforementioned configuration, disposing the transmittance limiting element on the optical path from the laser light source to the objective lens, and integrally forming the transmittance limiting element with the objective lens to move the transmittance limiting element together with the objective lens makes it possible to increase the lens shift range that does not change the value of iMLSE, without degrading the value of iMLSE when the lens shift amount is 0 mm. This is advantageous in reducing the assembling variation and the characteristics variation during an operation.

According to the aforementioned configuration, crosstalk cancellation is implemented while reducing the variation, and the error rate is advantageously reduced. This allows for the reproduction signal processor to reproduce a reproduction signal with high precision.

Preferably, a difference between a ratio of a width of the second central region of the dividing element in a direction associated with a radial direction of the optical disc with respect to a width of the light flux, and a ratio of a width of the first central region of the transmittance limiting element in the radial direction of the optical disc with respect to a width of the light flux may be within ±15%.

In the aforementioned configuration, it is possible to obtain most efficient crosstalk cancellation effect, and to obtain a reproduction signal of better quality.

Preferably, a width of the second central region of the dividing element in a radial direction of the optical disc may be within 45%±15% of a width of the light flux.

In the aforementioned configuration, the variation of the value of iMLSE is about 0.1%. Thus, it is possible to minimize the value of iMLSE. This is advantageous in obtaining a reproduction signal of better quality.

Preferably, the central amplifier and the end amplifiers may include a digital filter having frequency characteristics such that a gain to be given to the central amplifier and to the end amplifiers by the gain controller is determined by a tap coefficient. The gain controller may repeat computation from a gain initial value so that an evaluation value that is correlated with an error rate to be obtained by the reproduction signal processor is minimized and output an optimized gain.

In the aforementioned configuration, the gain to be given to the central amplifier and to the end amplifiers is given as the tap coefficient of the digital filter having frequency characteristics. This is advantageous in obtaining enhanced crosstalk cancellation effect.

Preferably, the gain controller may store in advance a gain initial value for a land portion and a gain initial value for a groove portion which are different from each other. When a polarity of the tracking control signal is inverted, and a track to be scanned by the light collecting spot is the land portion, the gain initial value for a land portion may be set in the central amplifier and in the end amplifiers. When a polarity of the tracking control signal is inverted, and a track to be scanned by the light collecting spot is the groove portion, the gain initial value for a groove portion may be set in the central amplifier and in the end amplifiers.

In the aforementioned configuration, the gain initial value for a land portion and the gain initial value for a groove portion can be set in accordance with the optical characteristics of the land portion and of the groove portion. This is advantageous in reducing crosstalk from an adjacent track within a short time, and in reducing the error rate. Thus, it is possible to instantaneously obtain a reproduction signal with high precision.

Preferably, the gain controller may set a gain initial value for the central amplifier and a gain initial value for the end amplifiers which are different from each other in accordance with a track pitch of the optical disc.

In the aforementioned configuration, it is possible to set the gain initial value in the central amplifier and the gain initial value in the end amplifiers in accordance with the track pitch of the optical disc. Therefore, even when optical discs having groove intervals different from each other are used, it is possible to reduce crosstalk from an adjacent track and to reduce the error rate. Thus, it is possible to reproduce a reproduction signal with high precision.

Preferably, the optical disc information device may be further provided with a tilt detector which detects a tilt amount of the optical disc in a radial direction. The gain controller may set a gain initial value in the central amplifier and a gain initial value in the end amplifiers in accordance with the tilt amount detected by the tilt detector.

In the aforementioned configuration, it is possible to set the gain initial value in the central amplifier and the gain initial value in the end amplifiers in accordance with the tilt amount of the optical disc in the radial direction. Therefore, even when the optical disc is tilted, it is possible to reduce crosstalk from an adjacent track and to reduce the error rate. Thus, it is possible to reproduce a reproduction signal with high precision.

Preferably, the control signal processor may detect an off track amount of the light collecting spot with respect to a track of the optical disc. The gain controller may set a gain initial value in the central amplifier and a gain initial value in the end amplifiers in accordance with the off track amount.

In the aforementioned configuration, it is possible to set the gain initial value in the central amplifier and the gain initial value in the end amplifiers in accordance with the off track amount of the light collecting spot. Therefore, even when off track of the light collecting spot has occurred, it is possible to reduce crosstalk from an adjacent track and to reduce the error rate. Thus, it is possible to reproduce a reproduction signal with high precision.

Preferably, the optical disc information device may be further provided with a lens shift detector which detects a lens shift amount of the objective lens. The gain controller may set a gain initial value in the central amplifier and a gain initial value in the end amplifiers in accordance with the lens shift amount detected by the lens shift detector.

In the aforementioned configuration, it is possible to set the gain initial value for the central amplifier and the gain initial value for the end amplifiers in accordance with the lens shift amount of the objective lens. Therefore, even when lens shift of the objective lens has occurred, it is possible to reduce crosstalk from an adjacent track and to reduce the error rate. Thus, it is possible to reproduce a reproduction signal with high precision.

The dividing element may be divided into two regions in a direction associated with a tangential direction of the optical disc, and may include a divided region and a tangential-direction end region. The divided region may be divided into four regions in directions associated with a radial direction of the optical disc. The second central region may include two divided central regions located at a center of the divided region. The second end regions may include two radial-direction end regions which interpose the two divided central regions therebetween, and the tangential-direction end region. The central light receiving portion may include two divided central light receiving portions which receive light fluxes of the two divided central regions. The end light receiving portions may include a first end light receiving portion which receives light fluxes of the two radial-direction end regions, and a second end light receiving portion which receives a light flux of the tangential-direction end region.

In the aforementioned configuration, dividing the second central region along a parting line passing near the optical axis makes it possible to prevent performance degradation with respect to stress when the objective lens is moved in the radial direction while following a groove-like track of the optical disc, and to secure a margin. Further, providing the tangential-direction end region in the tangential direction makes it possible to enhance the quality of a reproduction signal with respect to lens shift. Thus, it is possible to enhance the signal quality and to increase the margin for lens shift both in the radial direction and in the tangential direction. Further, the number of types of regions of the dividing element is reduced to four. This makes it possible to reduce an increase in size of a signal processing circuit such as the gain controller, the central amplifier, the end amplifiers, and the adder, and to enhance the quality of a reproduction signal including increasing the margin for lens shift.

Preferably, when a groove interval of the optical disc is Gp, the optical disc information device may satisfy (Gp/2)<(1.2·λ)/(2·NA).

In the aforementioned configuration, it is possible to reduce the track pitch to thereby provide a high-density optical disc.

An information processing device according to another aspect of the invention is provided with the optical disc information device having any one of the aforementioned configurations, and an information processor which processes information to be recorded in the optical disc information device and/or information reproduced from the optical disc information device.

In the information processing device having the aforementioned configuration, it is possible to reduce crosstalk by a system configured to obtain an actual tracking error signal, and to increase the recording density in the track direction. This is advantageous in performing stable high-density recording and reproduction, and in reducing the cost for wide use of the device.

As described above, the embodiments are described as an example of the technique in the present disclosure. Therefore, the accompanying drawings and the detailed description are provided to this effect.

The constituent elements described in the accompanying drawings and in the detailed description may not only include the constituent elements essentially required for solving the problems but also include the constituent elements which are provided to exemplify the technique and which are not essentially required for solving the problems. In view of the above, it should not be construed that these unessential constituent elements are essentially required simply because these unessential constituent elements are described in the accompanying drawings and in the detailed description.

Further, the aforementioned embodiments are provided to exemplify the technique in the present disclosure. Various modifications, replacements, additions, and/or omissions may be provided far as as such modifications, replacements, additions, and/or omissions do not depart from the scope of the claims as defined herein, or the scope substantially equivalent to the claims.

INDUSTRIAL APPLICABILITY

The optical disc information device of the invention is capable of stably recording and reproducing a high-density optical disc in which the track pitch is reduced. Therefore, the optical disc information device of the invention is advantageously used in a large-capacity computer memory device, a server, an optical disc player, and an optical disc recorder.

The invention claimed is:

1. An optical disc information device that performs at least one of reproducing information or recording information with respect to an optical disc having a track in the form of a groove, and capable of recording information in a land portion and in a groove portion of the groove, comprising:
    a laser light source which emits a light flux of a wavelength λ;
    an objective lens having a numerical aperture NA and configured to collect the light flux emitted from the laser light source and to form a light collecting spot on the optical disc;
    a transmittance limiting element including a first central region, and at least two first end regions which interpose the first central region therebetween, and configured to attenuate light passing through at least the first end regions out of the light flux emitted from the laser light source more strongly than light passing through the first central region;
    a dividing element including a second central region, and at least two second end regions which interpose the second central region therebetween, and configured to divide reflected light that is reflected and diffracted on the optical disc into a light flux of the second central region and light fluxes of the second end regions;
    a light detector including a central light receiving portion which receives the light flux of the second central region, and at least two end light receiving portions which receive the light fluxes of the second end regions, and configured to output a light amount signal in accordance with a light amount of each of the received light fluxes;
    a central amplifier which receives the light amount signal from the central light receiving portion and outputs a central amplification signal amplified by a predetermined gain;
    at least two end amplifiers which receive the light amount signals from the end light receiving portions and output end amplification signals amplified by a predetermined gain;
    a gain controller which controls the gain of the central amplifier and the gains of the end amplifiers;
    an adder which sums up the central amplification signal from the central amplifier and the end amplification signals from the end amplifiers, and outputs an information signal;
    a reproduction signal processor which processes the information signal and outputs a reproduction signal; and
    a control signal processor which receives reflected light that is reflected and diffracted on the optical disc, and generates a focusing control signal and a tracking control signal.

2. The optical disc information device according to claim 1, wherein
    the transmittance limiting element is divided into three regions in directions associated with a radial direction of the optical disc, and includes the first central region and the two first end regions, and
    the dividing element is divided into three regions in directions associated with the radial direction of the optical disc, and includes the second central region and the two second end regions.

3. The optical disc information device according to claim 1, wherein
the transmittance of the first end regions of the transmittance limiting element is 50% or more.

4. The optical disc information device according to claim 1, wherein
the transmittance limiting element is divided into five regions in directions associated with a radial direction of the optical disc,
the first end regions include two third end regions which interpose the first central region therebetween, and two fourth end regions which interpose the third end regions therebetween, and
the dividing element is divided into three regions in directions associated with the radial direction of the optical disc, and includes the second central region and the two second end regions.

5. The optical disc information device according to claim 4, wherein
the transmittance of the third end regions and of the fourth end regions of the transmittance limiting element is 50% or more.

6. The optical disc information device according to claim 1, wherein
the transmittance limiting element is disposed on an optical path between the laser light source and the objective lens.

7. The optical disc information device according to claim 6, wherein
the transmittance limiting element is integrally formed with the objective lens.

8. The optical disc information device according to claim 1, wherein
a difference between a ratio of a width of the second central region of the dividing element in a direction associated with a radial direction of the optical disc with respect to a width of the light flux, and a ratio of a width of the first central region of the transmittance limiting element in the radial direction of the optical disc with respect to a width of the light flux is within ±15%.

9. The optical disc information device according to claim 1, wherein
a width of the second central region of the dividing element in a radial direction of the optical disc is within 45%±15% of a width of the light flux.

10. The optical disc information device according to claim 1, wherein
the central amplifier and the end amplifiers include a digital filter having frequency characteristics such that a gain to be given to the central amplifier and to the end amplifiers by the gain controller is determined by a tap coefficient, and
the gain controller repeats computation from a gain initial value so that an evaluation value that is correlated with an error rate to be obtained by the reproduction signal processor is minimized and outputs an optimized gain.

11. The optical disc information device according to claim 1, wherein
the gain controller stores in advance a gain initial value for a land portion and a gain initial value for a groove portion which are different from each other,
when a polarity of the tracking control signal is inverted, and a track to be scanned by the light collecting spot is the land portion, the gain initial value for a land portion is set in the central amplifier and in the end amplifiers, and when a polarity of the tracking control signal is inverted, and a track to be scanned by the light collecting spot is the groove portion, the gain initial value for a groove portion is set in the central amplifier and in the end amplifiers.

12. The optical disc information device according to claim 1, wherein
the gain controller sets a gain initial value for the central amplifier and a gain initial value for the end amplifiers which are different from each other in accordance with a track pitch of the optical disc.

13. The optical disc information device according to claim 1, further comprising:
a tilt detector which detects a tilt amount of the optical disc in a radial direction, wherein
the gain controller sets a gain initial value in the central amplifier and a gain initial value in the end amplifiers in accordance with the tilt amount detected by the tilt detector.

14. The optical disc information device according to claim 1, wherein
the control signal processor detects an off track amount of the light collecting spot with respect to a track of the optical disc, and
the gain controller sets a gain initial value in the central amplifier and a gain initial value in the end amplifiers in accordance with the off track amount.

15. The optical disc information device according to claim 1, further comprising:
a lens shift detector which detects a lens shift amount of the objective lens, wherein
the gain controller sets a gain initial value in the central amplifier and a gain initial value in the end amplifiers in accordance with the lens shift amount detected by the lens shift detector.

16. The optical disc information device according to claim 1, wherein
the dividing element is divided into two regions in a direction associated with a tangential direction of the optical disc, and includes a divided region and a tangential-direction end region,
the divided region is divided into four regions in directions associated with a radial direction of the optical disc,
the second central region includes two divided central regions located at a center of the divided region,
the second end regions include two radial-direction end regions which interpose the two divided central regions therebetween, and the tangential-direction end region,
the central light receiving portion includes two divided central light receiving portions which receive light fluxes of the two divided central regions, and
the end light receiving portions include a first end light receiving portion which receives light fluxes of the two radial-direction end regions, and a second end light receiving portion which receives a light flux of the tangential-direction end region.

17. The optical disc information device according to claim 1, wherein
when a groove interval of the optical disc is Gp, the optical disc information device satisfies $(Gp/2) < (1.2 \cdot \lambda)/(2 \cdot NA)$.

18. An information processing device, comprising:
the optical disc information device of claim 1; and
an information processor which processes at least one of information to be recorded in the optical disc information device or information reproduced from the optical disc information device.

* * * * *